United States Patent
Kitaura et al.

(10) Patent No.: US 9,732,658 B2
(45) Date of Patent: Aug. 15, 2017

(54) ABNORMALITY DIAGNOSIS SYSTEM OF INTERNAL COMBUSTION ENGINE

(71) Applicant: Toyota Jidosha Kabushiki Kaisha, Toyota-shi, Aichi-ken (JP)

(72) Inventors: Koichi Kitaura, Toyota Aichi-ken (JP); Hiroshi Miyamoto, Sunto Shizuoka-ken (JP); Masahiro Kubo, Kariya Aichi-ken (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 513 days.

(21) Appl. No.: 14/496,187

(22) Filed: Sep. 25, 2014

(65) Prior Publication Data

US 2015/0086428 A1    Mar. 26, 2015

(30) Foreign Application Priority Data

Sep. 26, 2013  (JP) ................................ 2013-200342
May 16, 2014  (JP) ................................ 2014-102653

(51) Int. Cl.
*F01N 11/00* (2006.01)
*F01N 13/00* (2010.01)
(Continued)

(52) U.S. Cl.
CPC ........ *F01N 11/007* (2013.01); *F02D 41/1439* (2013.01); *F02D 41/1454* (2013.01); *F02D 41/1475* (2013.01); *F02D 41/222* (2013.01); *F01N 2550/02* (2013.01); *F01N 2560/025* (2013.01); *F01N 2560/14* (2013.01); *F01N 2900/0416* (2013.01); *F01N 2900/1624* (2013.01); *F02D 41/22* (2013.01); *F02D 2200/0814* (2013.01);
(Continued)

(58) Field of Classification Search
None
See application file for complete search history.

(56) References Cited

U.S. PATENT DOCUMENTS

| | | | | |
|---|---|---|---|---|
| 2008/0173008 | A1* | 7/2008 | Kidokoro | F01N 11/002 60/277 |
| 2010/0307135 | A1* | 12/2010 | Miyamoto | F01N 11/00 60/277 |

FOREIGN PATENT DOCUMENTS

| | | |
|---|---|---|
| JP | 2003-232247 A | 8/2003 |
| JP | 2009-057938 A | 3/2009 |

(Continued)

*Primary Examiner* — Jennifer Wecker
(74) *Attorney, Agent, or Firm* — Dinsmore & Shohl LLP

(57) ABSTRACT

An abnormality diagnosis system of an internal combustion engine which is provided with an exhaust purification catalyst 20 which can store oxygen is provided with a downstream side air-fuel ratio sensor 41 downstream of the catalyst and a catalyst abnormality diagnosis system which uses an output air-fuel ratio of the downstream side air-fuel ratio sensor when performing active air-fuel ratio control as the basis for diagnosing an exhaust purification catalyst for abnormality. The catalyst abnormality diagnosis system uses the amount of oxygen which is stored in or released from the exhaust purification catalyst in an air-fuel ratio reversal time period in active air-fuel ratio control as the basis to calculate the maximum storable oxygen amount of the exhaust purification catalyst and uses this as the basis to diagnose the exhaust purification catalyst for abnormality.

12 Claims, 14 Drawing Sheets

(51) Int. Cl.
  *F01N 3/28*    (2006.01)
  *F02B 3/00*    (2006.01)
  *F01N 3/00*    (2006.01)
  *G01M 15/10*   (2006.01)
  *F02D 41/14*   (2006.01)
  *F02D 41/02*   (2006.01)
  *F02D 41/00*   (2006.01)
  *F02D 41/30*   (2006.01)
  *F02M 63/00*   (2006.01)
  *F02D 41/22*   (2006.01)

(52) U.S. Cl.
  CPC ....... *F02D 2200/0816* (2013.01); *Y02T 10/40* (2013.01); *Y02T 10/47* (2013.01)

(56) References Cited

FOREIGN PATENT DOCUMENTS

| | | |
|---|---|---|
| JP | 2009-156201 A | 7/2009 |
| JP | 2009-293413 A | 12/2009 |
| JP | 2010-127091 A | 6/2010 |
| JP | 2010-180717 A | 8/2010 |
| JP | 2011-196317 A | 10/2011 |
| JP | 2012-241535 A | 12/2012 |

* cited by examiner

FIG. 1
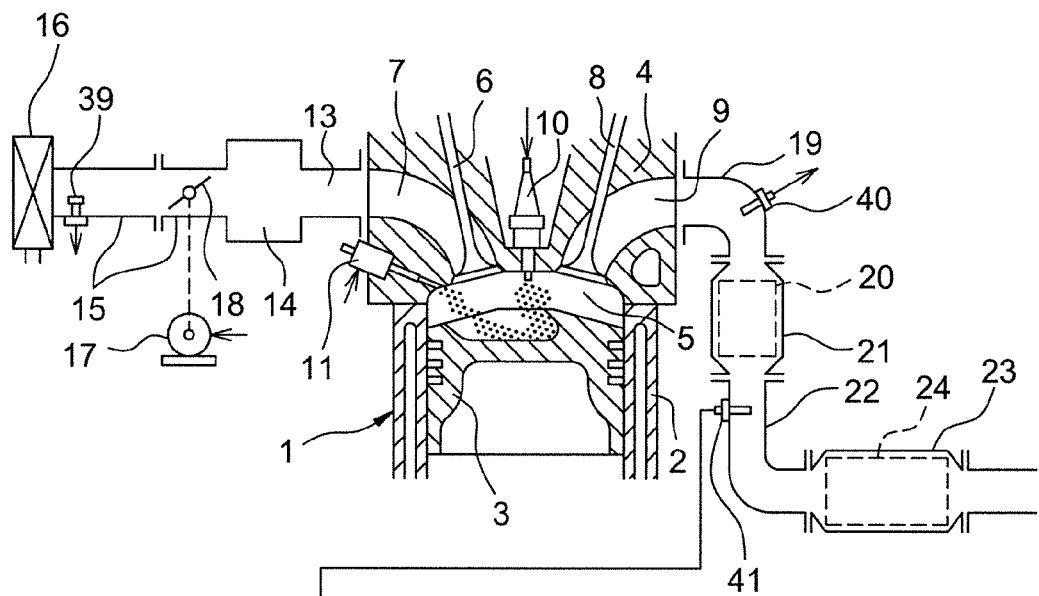
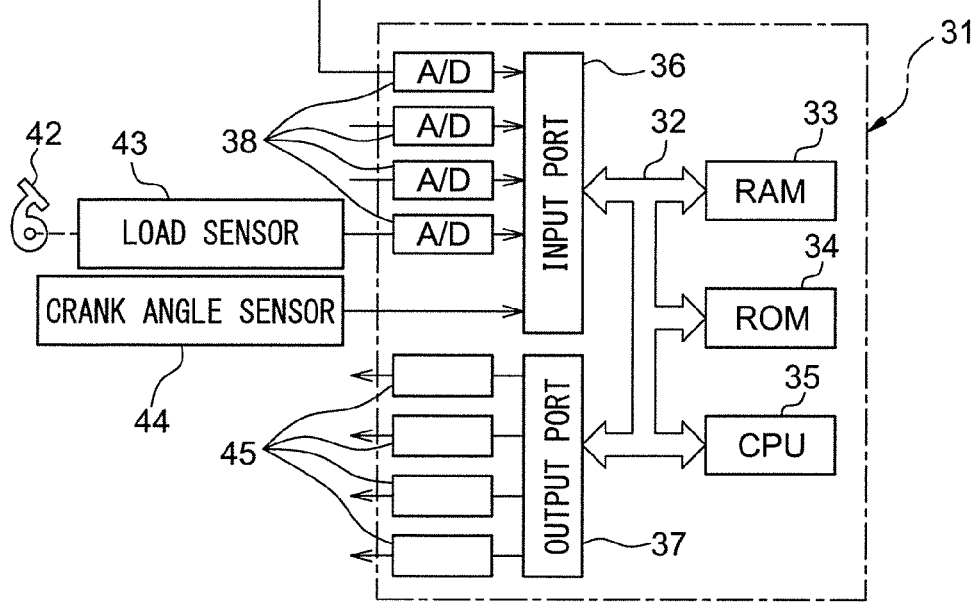

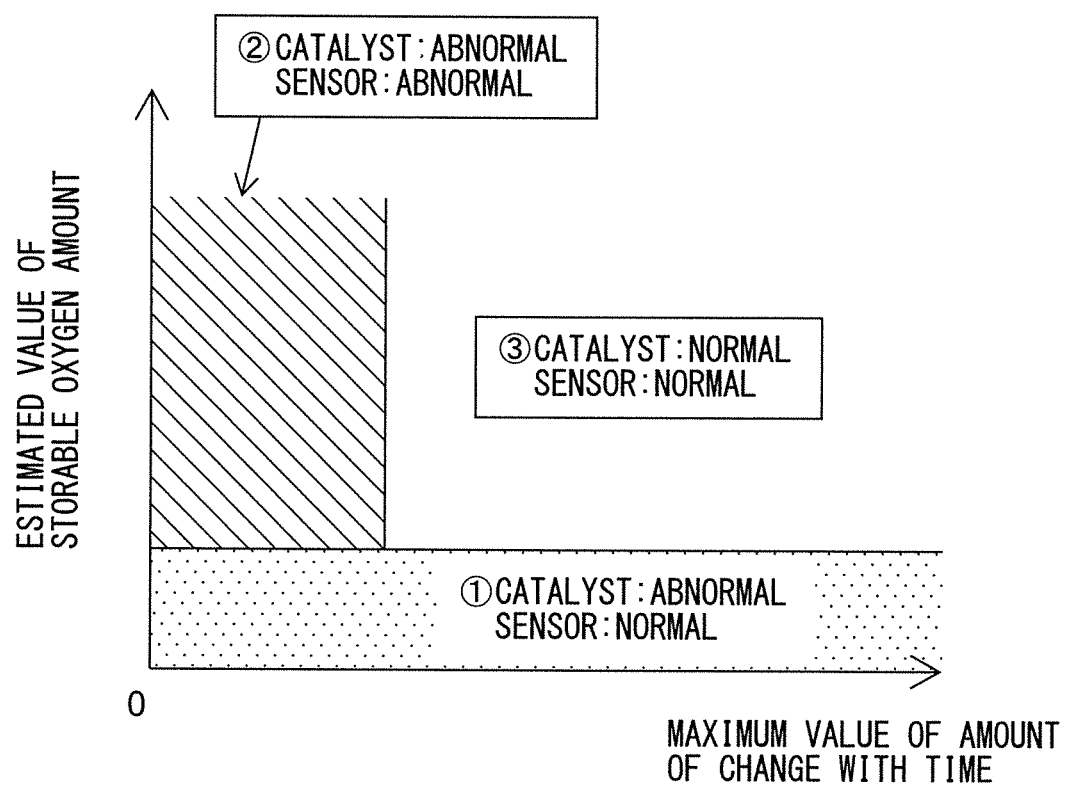

ABNORMALITY DIAGNOSIS SYSTEM OF INTERNAL COMBUSTION ENGINE

TECHNICAL FIELD

The present invention relates to an abnormality diagnosis system of an internal combustion engine.

BACKGROUND ART

In general, an exhaust passage of an internal combustion engine is provided with an exhaust purification catalyst for purifying the exhaust gas which is discharged from the internal combustion engine. As such an exhaust purification catalyst, for example, an exhaust purification catalyst which has an oxygen storage ability is used. An exhaust purification catalyst which has an oxygen storage ability can remove the unburned gas (HC, CO, etc.) or $NO_X$ etc. in the exhaust gas which flows into the exhaust purification catalyst when the stored amount of oxygen is an appropriate amount which is smaller than the maximum storable oxygen amount. That is, if exhaust gas of an air-fuel ratio which is richer than the stoichiometric air-fuel ratio (below, also called "rich air-fuel ratio") flows into the exhaust purification catalyst, the oxygen which is stored in the exhaust purification catalyst is used to remove the unburned gas in the exhaust gas by oxidation. On the other hand, if exhaust gas of an air-fuel ratio which is leaner than the stoichiometric air-fuel ratio (below, also called "lean air-fuel ratio") flows into the exhaust purification catalyst, the oxygen in the exhaust gas is stored in the exhaust purification catalyst. Due to this, the surface of the exhaust purification catalyst becomes an oxygen deficient state and, along with this, the NOx in the exhaust gas is removed by reduction. As a result, the exhaust purification catalyst can purify the exhaust gas regardless of the air-fuel ratio of the exhaust gas which flows into the exhaust purification catalyst so long as the stored amount of oxygen is an appropriate amount.

In this regard, an exhaust purification catalyst deteriorates the longer the time period of usage. It is known that when the exhaust purification catalyst deteriorates in this way, along with this, the maximum storable oxygen amount of the exhaust purification catalyst is reduced. For this reason, by detecting the maximum storable oxygen amount of the exhaust purification catalyst, it is possible to detect the degree of deterioration of the exhaust purification catalyst. As the method of detection of such a maximum storable oxygen amount, for example, it is known to perform active air-fuel ratio control which switches the air-fuel ratio of the exhaust gas which flows into the exhaust purification catalyst between the rich air-fuel ratio and the lean air-fuel ratio. With this method, the output of an oxygen sensor which is provided at the downstream side of the exhaust purification catalyst in the direction of flow of exhaust, which changes along with performance of active air-fuel ratio control, is used as the basis to estimate the maximum storable oxygen amount of the exhaust purification catalyst.

In particular, in the abnormality diagnosis system which is described in PLT 1, due to the active air-fuel ratio control, the target air-fuel ratio of the exhaust gas which flows into the exhaust purification catalyst is switched several times between the rich air-fuel ratio and the lean air-fuel ratio. On top of that, the maximum storable oxygen amount is measured several times, the average value of the measured values and the variation of the measured values are calculated, and the calculated average value and variation are used as the basis to estimate the maximum storable oxygen amount. According to PLT 1, due to this, it is considered possible to diagnose a catalyst for abnormality at a high precision while considering the presence of any deterioration of the air-fuel ratio which is provided at the upstream side of the oxygen sensor or exhaust purification catalyst in the direction of exhaust flow.

CITATIONS LIST

Patent Literature

PLT 1: Japanese Patent Publication No. 2010-180717A
PLT 2: Japanese Patent Publication No. 2011-196317A
PLT 3: Japanese Patent Publication No. 2009-156201A
PLT 4: Japanese Patent Publication No. 2010-127091A

SUMMARY OF INVENTION

Technical Problem

In this regard, as explained above, in the abnormality diagnosis system of PLT 1, active air-fuel ratio control is used to switch the target air-fuel ratio of the exhaust gas which flows into the exhaust purification catalyst several times between the rich air-fuel ratio and the lean air-fuel ratio. In particular, in the abnormality diagnosis system of PLT 1, the average value of the measured values of the maximum storable oxygen amount and the variation of the measured values have to be calculated, so a certain extent or more of times of switching of the target air-fuel ratio becomes necessary.

In this regard, if performing such active air-fuel ratio control, unburned gas or NOx etc. flows out from the exhaust purification catalyst. For this reason, if active air-fuel ratio control is used to switch the target air-fuel ratio between the rich air-fuel ratio and the lean air-fuel ratio a large number of times, sometimes deterioration of the exhaust emission will be invited.

Further, in PLT 1, when estimating the maximum storable oxygen amount several times, assuming that the engine operating state changes with each measurement, the larger the variation in the measured values, the smaller the deterioration in the exhaust purification catalyst is judged. However, depending on the timing of performance of active air-fuel ratio control, when estimating the maximum storable oxygen amount several times, the engine operating state may end up remaining constant and the variation in the measured values may become smaller. As a result, regardless of the fact that the exhaust purification catalyst has not deteriorated, there is a possibility that the exhaust purification catalyst will end up being diagnosed as having become abnormal and therefore there is a possibility that the accuracy of the abnormality diagnosis will fall.

Therefore, in consideration of the above problem, an object of the present invention is to provide an abnormality diagnosis system which can quickly and accurately diagnose an exhaust purification catalyst for abnormality.

Solution to Problem

To solve this problem, in a first aspect of the invention, there is provided an abnormality diagnosis system of an internal combustion engine comprising an exhaust purification catalyst which is arranged in an exhaust passage of the internal combustion engine and can store oxygen and a downstream side air-fuel ratio sensor which is arranged at a downstream side of said exhaust purification catalyst in a direction of exhaust flow, wherein said system comprises a catalyst abnormality diagnosis system which uses the output air-fuel ratio of said downstream side air-fuel ratio sensor when making the air-fuel ratio of the exhaust gas flowing into said exhaust purification catalyst change between a rich air-fuel ratio which is richer than the stoichiometric air-fuel ratio and a lean air-fuel ratio which is leaner than the stoichiometric air-fuel ratio as the basis to diagnose said exhaust purification catalyst for abnormality and wherein said catalyst abnormality diagnosis system calculates the maximum storable oxygen amount of said exhaust purification catalyst based on at least one of the amount of oxygen which is stored in said exhaust purification catalyst in an air-fuel ratio reversal time period where the output air-fuel ratio of said downstream side air-fuel ratio sensor changes from a rich judgment air-fuel ratio which is richer than the stoichiometric air-fuel ratio or less to a lean judgment air-fuel ratio which is leaner than the stoichiometric air-fuel ratio or more and the amount of oxygen which is released from said exhaust purification catalyst in an air-fuel ratio reversal time period where the output air-fuel ratio of said downstream side air-fuel ratio sensor changes from said lean judgment air-fuel ratio or more to less than said rich judgment air-fuel ratio or less, and performs first abnormality diagnosis wherein it judges that said exhaust purification catalyst has become abnormal when said calculated maximum storable oxygen amount is smaller than a lower limit storage amount, and wherein the system uses one of any of a cumulative oxygen excess/deficiency and a cumulative amount of intake air and time as a judgment parameter, and said catalyst abnormality diagnosis system performs second abnormality diagnosis wherein it judges that said exhaust purification catalyst has become abnormal even when said calculated maximum storable oxygen amount is a predetermined lower limit storage amount or more, if the ratio of the value of said judgment parameter in the time period where the stoichiometric air-fuel ratio judgment condition which shows that the output air-fuel ratio of said downstream side air-fuel ratio sensor is within a predetermined range near the stoichiometric air-fuel ratio compared with at least said two judgment air-fuel ratios is satisfied to the value of said judgment parameter in said air-fuel ratio reversal time period is a given reference value or less.

In a second aspect of the invention, there is provided the first aspect of the invention wherein said catalyst abnormality diagnosis system, at the time of performing said second abnormality diagnosis, judges that said exhaust purification catalyst has become abnormal when a ratio of the value of said judgment parameter in a time period where said stoichiometric air-fuel ratio judgment condition is satisfied in a lean-rich air-fuel ratio reversal time period where the output air-fuel ratio of said downstream side air-fuel ratio sensor changes from said lean judgment air-fuel ratio or more to said rich judgment air-fuel ratio or less to the value of said judgment parameter in said lean-rich air-fuel ratio reversal time period is a given reference value or less.

In a third aspect of the invention, there is provided the first aspect of the invention wherein said catalyst abnormality diagnosis system, at the time of performing said second abnormality diagnosis, judges that said exhaust purification catalyst has become abnormal when a ratio of the value of said judgment parameter in a time period where said stoichiometric air-fuel ratio judgment condition is satisfied in a rich-lean air-fuel ratio reversal time period where the output air-fuel ratio of said downstream side air-fuel ratio sensor changes from said rich judgment air-fuel ratio or less to said lean judgment air-fuel ratio or more to the value of said judgment parameter in said rich-lean air-fuel ratio reversal time period is a given reference value or less.

In a fourth aspect of the invention, there is provided any one of the first to third aspects of the invention wherein said stoichiometric air-fuel ratio judgment condition is a condition which is judged to be satisfied when the output air-fuel ratio of said downstream side air-fuel ratio sensor is between a stoichiometric judgment rich air-fuel ratio which is leaner than said rich judgment air-fuel ratio and a stoichiometric judgment lean air-fuel ratio which is richer than said lean judgment air-fuel ratio.

In a fifth aspect of the invention, there is provided any one of the first to third aspects of the invention wherein said stoichiometric air-fuel ratio judgment condition is a condition which is judged to be satisfied when the output air-fuel ratio of said downstream side air-fuel ratio sensor is between a stoichiometric judgment rich air-fuel ratio which is leaner than said rich judgment air-fuel ratio and a stoichiometric judgment lean air-fuel ratio which is richer than said lean judgment air-fuel ratio and the amount of change with time of the output air-fuel ratio of said downstream side air-fuel ratio sensor is a predetermined amount or less.

In a sixth aspect of the invention, there is provided any one of the first to fifth aspects of the invention wherein said catalyst abnormality diagnosis system, in said first abnormality diagnosis, calculates said maximum storable oxygen amount based only on the amount of oxygen which is released from said exhaust purification catalyst in the air-fuel ratio reversal time period in which the output air-fuel ratio of said downstream side air-fuel ratio sensor changes from the lean judgment air-fuel ratio or more to the rich judgment air-fuel ratio or less, and diagnoses said exhaust purification catalyst for abnormality based on the calculated maximum storable oxygen amount.

In a seventh aspect of the invention, there is provided any one of the first to fifth aspects of the invention wherein said catalyst abnormality diagnosis system, in said first abnormality diagnosis, calculates said maximum storable oxygen amount based only on the amount of oxygen which is stored in said exhaust purification catalyst in the air-fuel ratio reversal time period in which the output air-fuel ratio of said downstream side air-fuel ratio sensor changes from the rich judgment air-fuel ratio or more to the lean judgment air-fuel ratio or less, and diagnoses said exhaust purification catalyst for abnormality based on the calculated maximum storable oxygen amount.

In a eighth aspect of the invention, there is provided any one of the first to fifth aspects of the invention wherein said catalyst abnormality diagnosis system, in said first abnormality diagnosis, calculates said maximum storable oxygen amount based on the amount of oxygen which is stored in said exhaust purification catalyst in the air-fuel ratio reversal time period in which the output air-fuel ratio of said downstream side air-fuel ratio sensor changes from the rich judgment air-fuel ratio or more to the lean judgment air-fuel ratio or less and the amount of oxygen which is released from said exhaust purification catalyst in the air-fuel ratio reversal time period in which the output air-fuel ratio of said downstream side air-fuel ratio sensor changes from the lean judgment air-fuel ratio or more to the rich judgment air-fuel ratio or less, and diagnoses said exhaust purification catalyst for abnormality based on the calculated maximum storable oxygen amount.

In a ninth aspect of the invention, there is provided any one of the first to eighth aspects of the invention wherein said catalyst abnormality diagnosis system, in said second abnormality diagnosis, judges that the exhaust purification catalyst has become abnormal even when said calculated maximum storable oxygen amount is greater than a predetermined lower limit oxygen amount, if the amount of change with time of the output air-fuel ratio of said downstream side air-fuel ratio sensor in said air-fuel ratio reversal time period is a reference amount of change or less.

In a tenth aspect of the invention, there is provided any one of the first to ninth aspects of the invention wherein when it is judged by said second abnormality diagnosis that said exhaust purification catalyst has become abnormal, it is judged that said downstream side air-fuel ratio sensor has also become abnormal.

In eleventh aspect of the invention, there is provided any one of the first to tenth aspects of the invention wherein when it is judged that said exhaust purification catalyst has become abnormal, a warning light is lit.

In twelfth aspect of the invention, there is provided the tenth aspect of the invention wherein when it is judged that said downstream side air-fuel ratio sensor has become abnormal, a warning light is lit.

Advantageous Effects of Invention

According to the present invention, there is provided an abnormality diagnosis system which can quickly and accurately diagnose an exhaust purification catalyst for abnormality.

BRIEF DESCRIPTION OF DRAWINGS

FIG. 1 is a view which schematically shows an internal combustion engine in which an abnormality diagnosis device of the first embodiment of the present invention is used.

FIG. 15 is a view which shows the relationship between a maximum value of an amount of change with time and an estimated value of the maximum storable oxygen amount and judgment of abnormality.

DESCRIPTION OF EMBODIMENTS

Figure 2A:
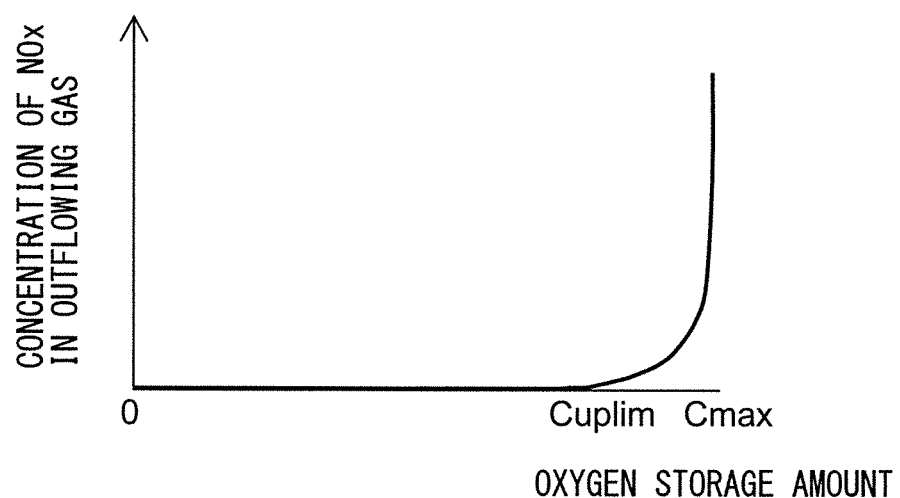
FIG. 2A is a view which shows the relationship between the stored amount of oxygen of the upstream side exhaust purification catalyst and concentration of components in the exhaust gas having a lean air-fuel ration and which flows out from the exhaust purification catalyst.

Below, referring to the drawings, an embodiment of the present invention will be explained in detail. Note that, in the following explanation, similar component elements are assigned the same reference numerals <Explanation of Internal Combustion Engine as a Whole>

FIG. 1 is a view which schematically shows an internal combustion engine in which an abnormality diagnosis system according to a first embodiment of the present invention is used. Referring to FIG. 1, 1 indicates an engine body, 2 a cylinder block, 3 a piston which reciprocates inside the cylinder block 2, 4 a cylinder head which is fastened to the cylinder block 2, 5 a combustion chamber which is formed between the piston 3 and the cylinder head 4, 6 an intake valve, 7 an intake port, 8 an exhaust valve, and 9 an exhaust port. The intake valve 6 opens and closes the intake port 7, while the exhaust valve 8 opens and closes the exhaust port 9.

As shown in FIG. 1, a spark plug 10 is arranged at a center part of an inside wall surface of the cylinder head 4, while a fuel injector 11 is arranged at a side part of the inner wall surface of the cylinder head 4. The spark plug 10 is configured to generate a spark in accordance with an ignition signal. Further, the fuel injector 11 injects a predetermined amount of fuel into the combustion chamber 5 in accordance with an injection signal. Note that, the fuel injector 11 may also be arranged so as to inject fuel into the intake port 7. Further, in the present embodiment, as the fuel, gasoline with a stoichiometric air-fuel ratio of 14.6 is used. However, the internal combustion engine using the abnormality diagnosis system of the present invention may also use another fuel.

The intake port 7 of each cylinder is connected to a surge tank 14 through a corresponding intake runner 13, while the surge tank 14 is connected to an air cleaner 16 through an intake pipe 15. The intake port 7, intake runner 13, surge tank 14, and intake pipe 15 form an intake passage. Further, inside the intake pipe 15, a throttle valve 18 which is driven by a throttle valve drive actuator 17 is arranged. The throttle valve 18 can be operated by the throttle valve drive actuator 17 to thereby change the aperture area of the intake passage.

On the other hand, the exhaust port 9 of each cylinder is connected to an exhaust manifold 19. The exhaust manifold 19 has a plurality of runners which are connected to the exhaust ports 9 and a header at which these runners are collected. The header of the exhaust manifold 19 is connected to an upstream side casing 21 which houses an upstream side exhaust purification catalyst 20. The upstream side casing 21 is connected through an exhaust pipe 22 to a downstream side casing 23 which houses a downstream side exhaust purification catalyst 24. The exhaust port 9, exhaust manifold 19, upstream side casing 21, exhaust pipe 22, and downstream side casing 23 form an exhaust passage.

The electronic control unit (ECU) 31 is comprised of a digital computer which is provided with components which are connected together through a bidirectional bus 32 such as a RAM (random access memory) 33, ROM (read only memory) 34, CPU (microprocessor) 35, input port 36, and output port 37. In the intake pipe 15, an air flow meter 39 is arranged for detecting the flow rate of air which flows through the intake pipe 15. The output of this air flow meter 39 is input through a corresponding AD converter 38 to the input port 36. Further, at the header of the exhaust manifold 19, an upstream side air-fuel ratio sensor 40 is arranged which detects the air-fuel ratio of the exhaust gas which flows through the inside of the exhaust manifold 19 (that is, the exhaust gas which flows into the upstream side exhaust purification catalyst 20). In addition, in the exhaust pipe 22, a downstream side air-fuel ratio sensor 41 is arranged which detects the air-fuel ratio of the exhaust gas which flows through the inside of the exhaust pipe 22 (that is, the exhaust gas which flows out from the upstream side exhaust purification catalyst 20 and flows into the downstream side exhaust purification catalyst 24). The outputs of these air-fuel ratio sensors 40 and 41 are also input through the corresponding AD converters 38 to the input port 36. Note that, the configurations of these air-fuel ratio sensors 40 and 41 will be explained later.

Further, an accelerator pedal 42 has a load sensor 43 connected to it which generates an output voltage which is proportional to the amount of depression of the accelerator pedal 42. The output voltage of the load sensor 43 is input to the input port 36 through a corresponding AD converter 38. The crank angle sensor 44 generates an output pulse every time, for example, a crankshaft rotates by 15 degrees. This output pulse is input to the input port 36. The CPU 35 calculates the engine speed from the output pulse of this crank angle sensor 44. On the other hand, the output port 37 is connected through corresponding drive circuits 45 to the spark plugs 10, fuel injectors 11, and throttle valve drive actuator 17. Note that, ECU 31 acts as abnormality diagnosis system for diagnosing abnormality of the internal combustion engine (in particular, the upstream side exhaust purification catalyst 20 and the downstream side exhaust purification catalyst 24).

<Explanation of Exhaust Purification Catalyst>

The upstream side exhaust purification catalyst 20 and downstream side exhaust purification catalyst 24 in each case have similar configurations. Although the upstream side exhaust purification catalyst 20 will be explained below, the upstream side exhaust purification catalyst 24 has similar configurations and functions.

The upstream side exhaust purification catalyst 20 is three-way catalysts which have oxygen storage abilities. Specifically, the upstream side exhaust purification catalyst 20 is comprised of substrates which are comprised of ceramic on which a precious metal which has a catalytic action (for example, platinum (Pt)) and a substance which has an oxygen storage ability (for example, ceria ($CeO_2$)) are carried. The upstream side exhaust purification catalyst 20 exhibits a catalytic action of simultaneously removing unburned gas (HC, CO, etc.) and nitrogen oxides ($NO_X$) when reaching a predetermined activation temperature and, in addition, an oxygen storage ability.

According to the oxygen storage ability of the upstream side exhaust purification catalyst 20, the upstream side exhaust purification catalyst 20 stores the oxygen in the exhaust gas when the air-fuel ratio of the exhaust gas which flows into the upstream side exhaust purification catalyst 20 is leaner than the stoichiometric air-fuel ratio (lean air-fuel ratio). On the other hand, the upstream side exhaust purification catalyst 20 releases the oxygen which is stored in the upstream side exhaust purification catalyst 20 when the inflowing exhaust gas has an air-fuel ratio which is richer than the stoichiometric air-fuel ratio (rich air-fuel ratio).

The upstream side exhaust purification catalyst has a catalytic action and oxygen storage ability and thereby have the action of removing NOx and unburned gas according to the stored amount of oxygen. That is, as shown in FIG. 2A, when the air-fuel ratio of the exhaust gas which flows into the upstream side exhaust purification catalyst 20 is a lean air-fuel ratio, when the stored amount of oxygen is small, the upstream side exhaust purification catalyst 20 stores the oxygen in the exhaust gas, and thus the $NO_X$ is removed by reduction. Further, if the stored amount of oxygen becomes larger, the exhaust gas which flows out from the exhaust purification catalyst rapidly rises in concentration of oxygen and $NO_X$ at a certain stored amount near the maximum storable oxygen amount Cmax (in the figure, Cuplim).

Figure 2B:
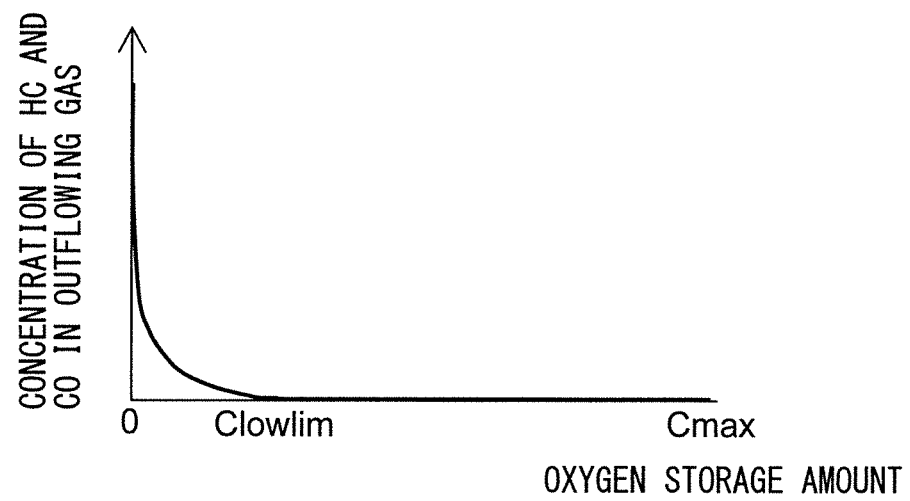
FIG. 2B is a view which shows the relationship between the stored amount of oxygen of the upstream side exhaust purification catalyst and concentration of components in the exhaust gas having a rich air-fuel ration and which flows out from the exhaust purification catalyst.

On the other hand, as shown in FIG. 2B, when the air-fuel ratio of the exhaust gas which flows into the upstream side exhaust purification catalyst 20 is the rich air-fuel ratio, when the stored amount of oxygen is large, the oxygen which is stored in the upstream side exhaust purification catalyst 20 is released, and the unburned gas in the exhaust gas is removed by oxidation. Further, if the stored amount of oxygen becomes small, the exhaust gas which flows out from the exhaust purification catalyst rapidly rises in concentration of unburned gas at a certain stored amount near zero (in the figure, Clowlim).

In the above way, according to the exhaust purification catalysts 20 and 24 which are used in the present embodiment, the characteristics of removal of $NO_X$ and unburned gas in the exhaust gas change depending on the air-fuel ratio and stored amount of oxygen of the exhaust gas which flows into the exhaust purification catalysts 20 and 24. Note that, if having a catalytic action and oxygen storage ability, the exhaust purification catalysts 20 and 24 may also be catalysts different from three-way catalysts.

<Configuration of Air-Fuel Ratio Sensor>

Figure 3:
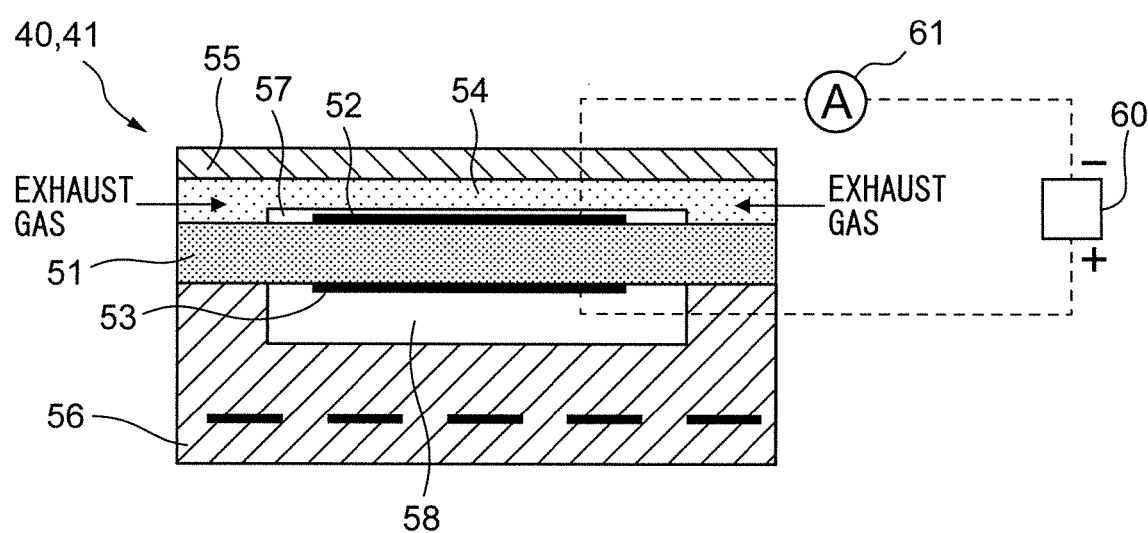
FIG. 3 is a schematic cross-sectional view of an air-fuel ratio sensor.

Next, referring to FIG. 3, the configurations of air-fuel ratio sensors 40 and 41 in the present embodiment will be explained. FIG. 3 is a schematic cross-sectional view of air-fuel ratio sensors 40 and 41. As will be understood from FIG. 3, the air-fuel ratio sensors 40 and 41 in the present embodiment are single-cell type air-fuel ratio sensors each comprised of a solid electrolyte layer and a pair of electrodes forming a single cell.

As shown in FIG. 3, each of the air-fuel ratio sensors 40 and 41 is provided with a solid electrolyte layer 51, an exhaust side electrode (first electrode) 52 which is arranged at one side surface of the solid electrolyte layer 51, an atmosphere side electrode (second electrode) 53 which is arranged at the other side surface of the solid electrolyte layer 51, a diffusion regulation layer 54 which regulates the diffusion of the passing exhaust gas, a protective layer 55 which protects the diffusion regulation layer 54, and a heater part 56 which heats the air-fuel ratio sensor 40 or 41.

On one side surface of the solid electrolyte layer 51, a diffusion regulation layer 54 is provided. On the side surface of the diffusion regulation layer 54 at the opposite side from the side surface of the solid electrolyte layer 51 side, a protective layer 55 is provided. In the present embodiment, a measured gas chamber 57 is formed between the solid electrolyte layer 51 and the diffusion regulation layer 54. Further, the exhaust side electrode 52 is arranged inside the measured gas chamber 57, and the exhaust gas is introduced through the diffusion regulation layer 54 into the measured gas chamber 57. On the other side surface of the solid electrolyte layer 51, the heater part 56 is provided. Between the solid electrolyte layer 51 and the heater part 56, a reference gas chamber 58 is formed. Inside this reference gas chamber 58, a reference gas (for example, atmospheric gas) is introduced. The atmosphere side electrode 53 is arranged inside the reference gas chamber 58.

The solid electrolyte layer 51 is formed by a sintered body of $ZrO_2$ (zirconia), $HfO_2$, $ThO_2$, $Bi_2O_3$, or other oxygen ion conducting oxide in which CaO, MgO, $Y_2O_3$, $Yb_2O_3$, etc. is blended as a stabilizer. Further, the diffusion regulation layer 54 is formed by a porous sintered body of alumina, magnesia, silica, spinel, mullite, or another heat resistant inorganic substance. Furthermore, the exhaust side electrode 52 and atmosphere side electrode 53 is formed by platinum or other precious metal with a high catalytic activity.

Further, between the exhaust side electrode 52 and the atmosphere side electrode 53, sensor voltage Vr is supplied by the voltage supply device 60 which is mounted on the ECU 31. In addition, the ECU 31 is provided with a current detection device 61 which detects the current which flows between these electrodes 52 and 53 through the solid electrolyte layer 51 when the voltage supply device 60 supplies the sensor voltage Vr. The current which is detected by this current detection device 61 is the output current of the air-fuel ratio sensors 40 and 41.

Figure 4:
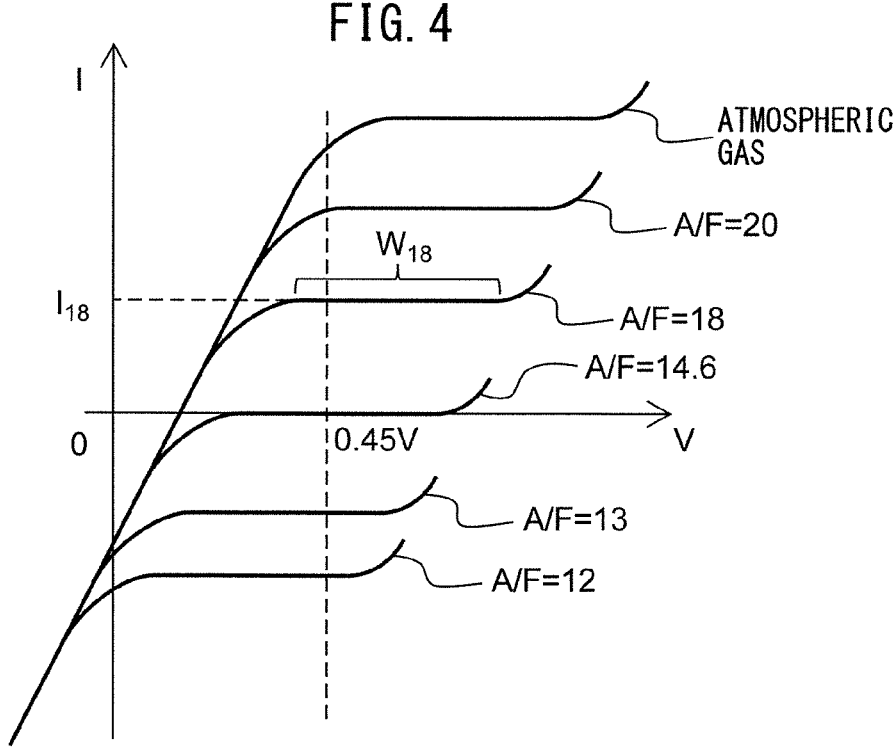
FIG. 4 is a view which shows the relationship between the voltage supplied to the sensor and output current at different exhaust air-fuel ratios.

The thus configured air-fuel ratio sensors 40 and 41 have the voltage-current (V-I) characteristic such as shown in FIG. 4. As will be understood from FIG. 4, the output current I becomes larger the higher the exhaust air-fuel ratio (the leaner). Further, at the line V-I of each exhaust air-fuel ratio, there is a region parallel to the V axis, that is, a region where the output current does not change much at all even if the sensor voltage changes. This voltage region is called the "limit current region". The current at this time is called the "limit current". In FIG. 4, the limit current region and limit current when the exhaust air-fuel ratio is 18 are shown by $W_{18}$ and $I_{18}$.

Figure 5:
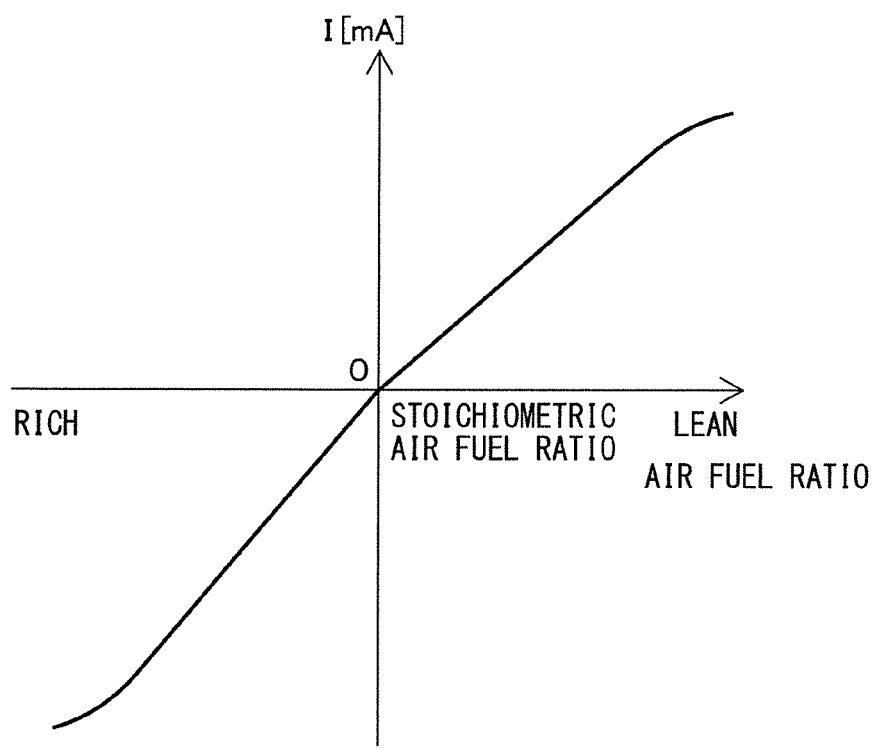
FIG. 5 is a view which shows the relationship between the exhaust air-fuel ratio and output current when making the voltage supplied to the sensor constant.

FIG. 5 is a view which shows the relationship between the exhaust air-fuel ratio and the output current I when making the supplied voltage constant at about 0.45V. As will be understood from FIG. 5, in the air-fuel ratio sensors 40 and 41, the higher the exhaust air-fuel ratio (that is, the leaner), the greater the output current I from the air-fuel ratio sensors 40 and 41. In addition, the air-fuel ratio sensors 40 and 41 are configured so that the output current I becomes zero when the exhaust air-fuel ratio is the stoichiometric air-fuel ratio. Further, when the exhaust air-fuel ratio becomes larger by a certain extent or more or when it becomes smaller by a certain extent or more, the ratio of change of the output current to the change of the exhaust air-fuel ratio becomes smaller.

Note that, in the above example, as the air-fuel ratio sensors 40 and 41, limit current type air-fuel ratio sensors of the structure which is shown in FIG. 3 are used. However, as the upstream side air-fuel ratio sensor 40, for example, it is also possible to use a cup-type limit current type air-fuel ratio sensor or other structure of limit current type air-fuel ratio sensor or air-fuel ratio sensor not a limit current type or any other air-fuel ratio sensor.

Basic Control

In the thus configured internal combustion engine, the outputs of the upstream side air-fuel ratio sensor 40 and the downstream side air-fuel ratio sensor 41 are used as the basis for making the air-fuel ratio of the exhaust gas which flows into the upstream side exhaust purification catalyst 20 the optimal target air-fuel ratio based on the engine operating state by setting the fuel injection quantity from the fuel injector 11. As the method of setting the fuel injection quantity, the method of using the output of the upstream side air-fuel ratio sensor 40 as the basis for controlling the air-fuel ratio of the exhaust gas which flows into the upstream side exhaust purification catalyst 20 (or the air-fuel ratio of the exhaust gas which flows out from the engine body) to the target air-fuel ratio and of using the output of the downstream side air-fuel ratio sensor 41 as the basis for correcting the output of the upstream side air-fuel ratio sensor 40 or changing the target air-fuel ratio may be mentioned.

Figure 6:
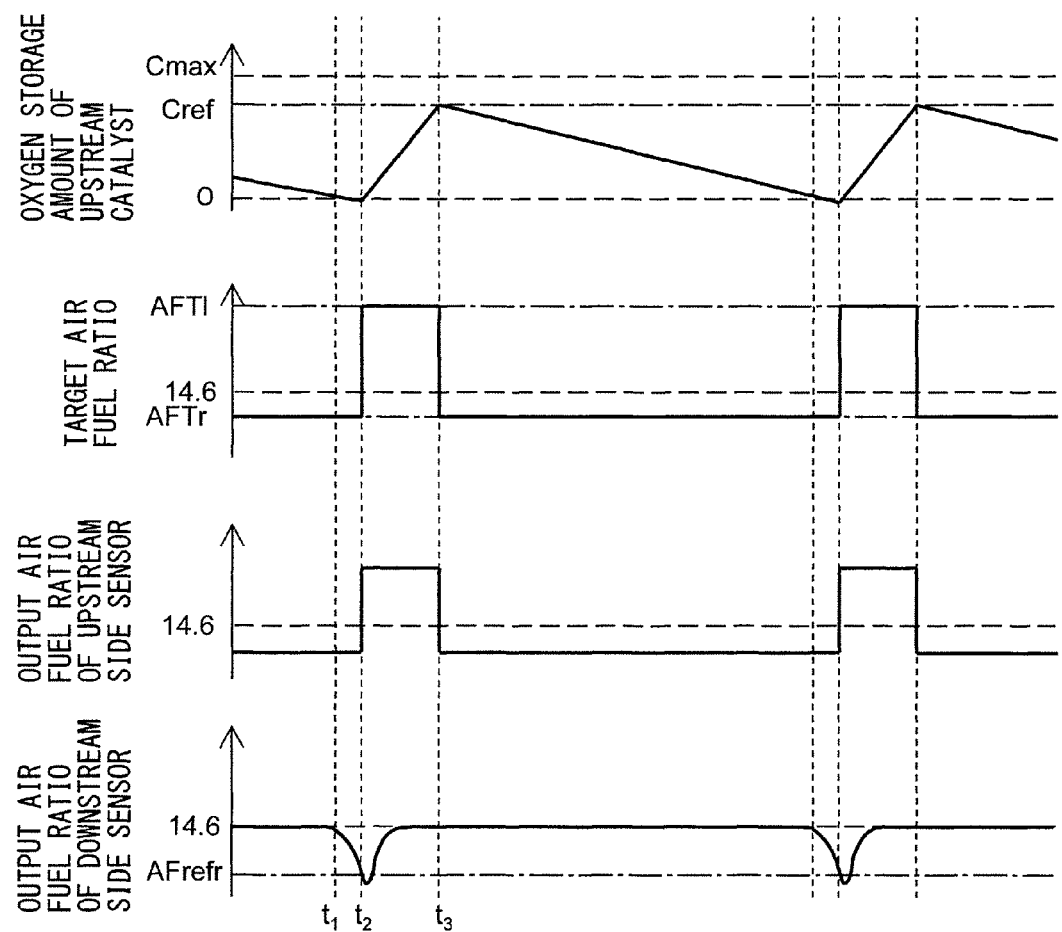
FIG. 6 is a time chart of an oxygen storage amount etc. in the normal operation of the internal combustion engine.

Referring to FIG. 6, an example of such control of the target air-fuel ratio will be simply explained. FIG. 6 is a time chart of parameters at the time of ordinary operation (ordinary control) of the internal combustion engine such as the stored amount of oxygen of the upstream side exhaust purification catalyst 20, the target air-fuel ratio, the output air-fuel ratio of the upstream side air-fuel ratio sensor 40, and the output air-fuel ratio of the downstream side air-fuel ratio sensor 41. Note that, the "output air-fuel ratio" means the air-fuel ratio which corresponds to the output of the air-fuel ratio sensor. Further, "at the time of ordinary operation (ordinary control)" means the operating state (control state) when not performing control for adjusting the fuel injection quantity in accordance with a specific operating state of the internal combustion engine (for example, correction to increase the fuel injection quantity performed at the time of acceleration of the vehicle which mounts the internal combustion engine, fuel cut control, etc.)

In the example which is shown in FIG. 6, when the output air-fuel ratio of the downstream side air-fuel ratio sensor 41 becomes less than a rich judgment air-fuel ratio AFrefr (for example, 14.55) which is richer than the stoichiometric air-fuel ratio, the target air-fuel ratio is set to and maintained at the lean set air-fuel ratio AFTl (for example, 15). After that, the stored amount of oxygen of the upstream side exhaust purification catalyst 20 is estimated. When this estimated value becomes a predetermined judgment reference storage amount Cref (amount smaller than the maximum storable oxygen amount Cmax) or more, the target air-fuel ratio is set to and maintained at the rich set air-fuel ratio AFTr (for example, 14.4). In the example which is shown in FIG. 6, such an operation is repeatedly performed.

Specifically, in the example which is shown in FIG. 6, before the time $t_1$, the target air-fuel ratio is made the rich set air-fuel ratio AFTr. Along with this, the output air-fuel ratio of the upstream side air-fuel ratio sensor 40 also becomes the rich air-fuel ratio. Further, the upstream side exhaust purification catalyst 20 stores oxygen, so the output air-fuel ratio of the downstream side air-fuel ratio sensor 41 becomes substantially the stoichiometric air-fuel ratio (14.6). At this time, the air-fuel ratio of the exhaust gas which flows into the upstream side exhaust purification catalyst 20 becomes the rich air-fuel ratio, so the stored amount of oxygen of the upstream side exhaust purification catalyst 20 gradually falls.

After that, at the time $t_1$, the stored amount of oxygen of the upstream side exhaust purification catalyst 20 approaches zero, whereby part of the unburned gas which flows into the upstream side exhaust purification catalyst 20 starts to flow out without being removed by the upstream side exhaust purification catalyst 20. As a result, at the time $t_2$, the output air-fuel ratio of the downstream side air-fuel ratio sensor 41 becomes the rich judgment air-fuel ratio AFrefr. At this time, the target air-fuel ratio is switched from the rich set air-fuel ratio AFTr to the lean set air-fuel ratio AFTl.

Due to the switching of the target air-fuel ratio, the air-fuel ratio of the exhaust gas which flows into the upstream side exhaust purification catalyst 20 becomes the lean air-fuel ratio and the outflow of unburned gas is reduced and stops. Further, the stored amount of oxygen of the upstream side exhaust purification catalyst 20 gradually increases and, at the time $t_3$, reaches the judgment reference storage amount Cref. If the stored amount of oxygen reaches the judgment reference storage amount Cref in this way, the target air-fuel ratio is again switched from the lean set air-fuel ratio AFTl to the rich set air-fuel ratio AFTr. Due to this switching of the target air-fuel ratio, the air-fuel ratio of the exhaust gas which flows into the upstream side exhaust purification catalyst 20 again becomes the lean air-fuel ratio and, as a result, the stored amount of oxygen of the upstream side exhaust purification catalyst 20 gradually is reduced. After this, such an operation is repeatedly performed. By performing such control, it is possible to prevent NOx from flowing out from the upstream side exhaust purification catalyst 20.

Note that, the control of the target air-fuel ratio based on the outputs of the upstream side air-fuel ratio sensor 40 and the downstream side air-fuel ratio sensor 41 is not limited to the above-mentioned control. So long as control which utilizes the outputs of these air-fuel ratio sensors 40 and 41, any type of control is possible.

Diagnosis of Exhaust Purification Catalyst for Abnormality

Next, referring to FIG. 7, diagnosis of the upstream side exhaust purification catalyst 20 for abnormality will be explained. In the present embodiment, when diagnosing the upstream side exhaust purification catalyst 20 for abnormality, active air-fuel ratio control is performed to alternately switch the target air-fuel ratio of the exhaust gas which flows into the upstream side exhaust purification catalyst 20 between the rich air-fuel ratio and the lean air-fuel ratio. Further, during performance of this active air-fuel ratio control, the amount of the oxygen which is stored in the upstream side exhaust purification catalyst 20 or the amount of the oxygen which is released from the upstream side exhaust purification catalyst 20 is estimated.

Further, as a result of performing such active air-fuel ratio control, the total amount of oxygen which is stored in the upstream side exhaust purification catalyst 20 until the output air-fuel ratio of the downstream side air-fuel ratio sensor 41 changes from the rich judgment air-fuel ratio to the lean judgment air-fuel ratio (air-fuel ratio leaner than the stoichiometric air-fuel ratio, for example, 14.65) is calculated as the maximum storable oxygen amount. Alternatively, the total amount of oxygen which is released from the upstream side exhaust purification catalyst 20 until the output air-fuel ratio of the downstream side air-fuel ratio sensor 41 changes from the lean judgment air-fuel ratio to the rich judgment air-fuel ratio is calculated as the maximum storable oxygen amount. When the thus calculated the maximum storable oxygen amount is smaller than the lower limit storage amount, it is judged that the upstream side exhaust purification catalyst 20 has become abnormal due to deterioration. On the other hand, when the calculated maximum storable oxygen amount is the lower limit storage amount or more, it is judged that the upstream side exhaust purification catalyst 20 has not become abnormal due to deterioration. Note that, the lower limit storage amount may be a predetermined amount or may be a value which changes according to the operating parameters of the internal combustion engine.

Further, in the present embodiment, the amounts (flow rates) of oxygen which is stored in the upstream side exhaust purification catalyst 20 and oxygen which is released from the upstream side exhaust purification catalyst 20 are calculated based on the output air-fuel ratio of the upstream side air-fuel ratio sensor 40 and the amount of intake air etc. of the internal combustion engine. Specifically, the ECU 31 calculates the amount of oxygen which becomes excessive or becomes deficient when trying to make the air-fuel ratio of the exhaust gas which flows into the upstream side exhaust purification catalyst 20 the stoichiometric air-fuel ratio as the "oxygen excess/deficiency".

That is, the ECU 31 calculates the amount of oxygen which is contained in this exhaust gas or the amount of oxygen which is necessary for making the unburned gas etc. which is contained in this exhaust gas burn when assuming that the oxygen and unburned gas etc. in the exhaust gas which flows into the upstream side exhaust purification catalyst 20 completely react. For example, the oxygen excess/deficiency is calculated based on the output air-fuel ratio AFup of the upstream side air-fuel ratio sensor 40 and the estimated value of the amount of intake air of the combustion chamber 5 which is calculated based on the air flow meter 39 etc. or the fuel feed amount from the fuel injector 11. Specifically, the oxygen excess/deficiency OED is, for example, calculated by the following formula (1).

$$ODE = 0.23 \cdot Qi/(AFup - 14.6) \quad (1)$$

where, 0.23 is the oxygen concentration in air, Qi is the fuel injection quantity, and AFup is the output air-fuel ratio of the upstream side air-fuel ratio sensor 40.

The thus calculated oxygen excess/deficiency can be cumulatively added until the output air-fuel ratio of the downstream side air-fuel ratio sensor 41 changes from the rich judgment air-fuel ratio to the lean judgment air-fuel ratio to thereby calculate the maximum storable oxygen amount. Alternatively, the thus calculated oxygen excess/deficiency can be cumulatively added until the output air-fuel ratio of the downstream side air-fuel ratio sensor 41 changes from the lean judgment air-fuel ratio to the rich judgment air-fuel ratio to thereby calculate the maximum storable oxygen amount.

Figure 7:
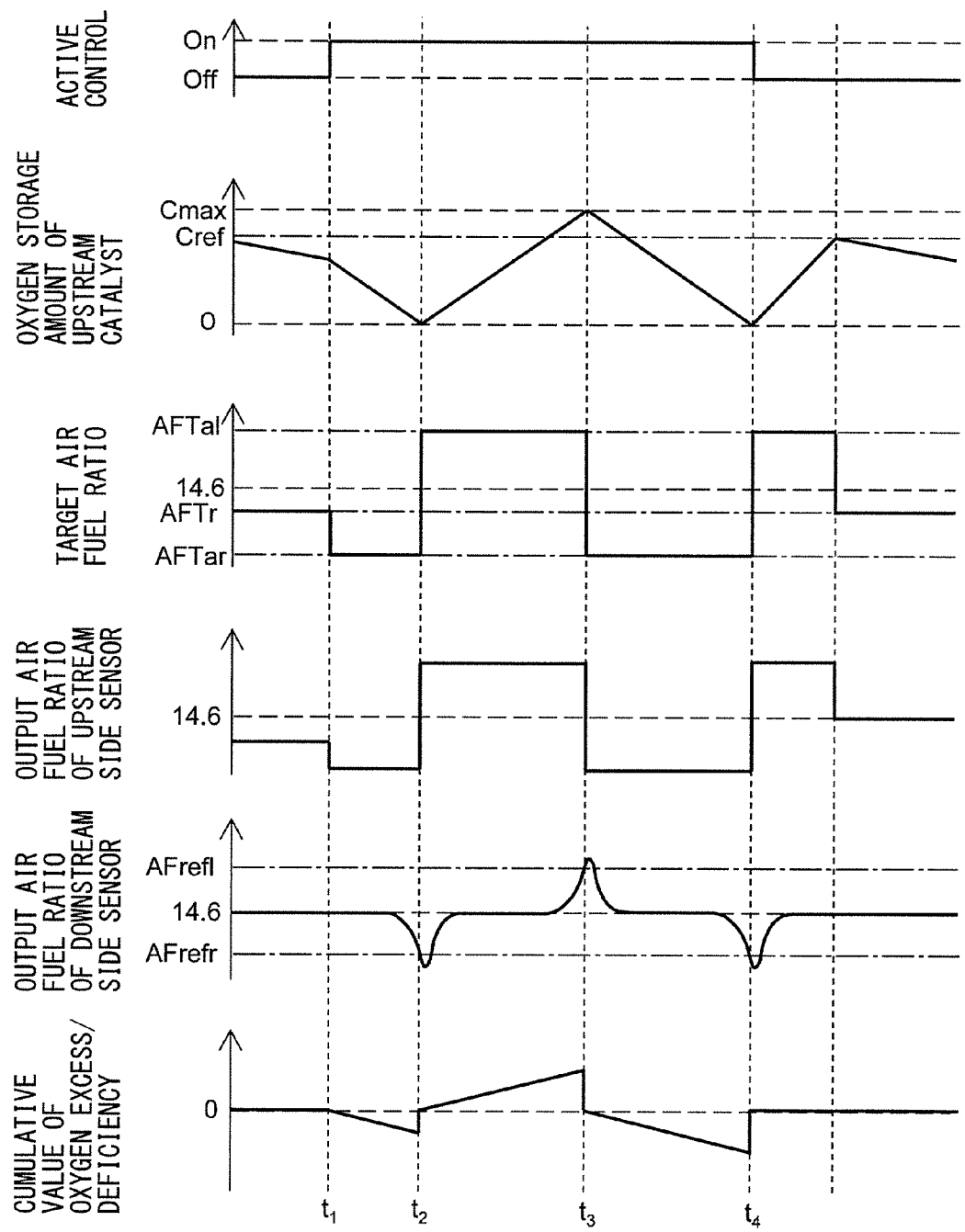
FIG. 7 is a time chart of an output air-fuel ratio of an air-fuel ratio sensor etc. when performing active control.

FIG. 7 is a time chart of parameters at the time of active air-fuel ratio control when diagnosing the upstream side exhaust purification catalyst 20 for abnormality such as the stored amount of oxygen, the target air-fuel ratio, the output air-fuel ratio of the upstream side air-fuel ratio sensor 40, the output air-fuel ratio of the downstream side air-fuel ratio sensor 41, and the cumulative value of the oxygen excess/deficiency.

In the example which is shown in FIG. 7, before the time $t_1$, the target air-fuel ratio of the exhaust gas which flows into the upstream side exhaust purification catalyst 20 is made the rich set air-fuel ratio AFTr. For this reason, the output air-fuel ratio of the upstream side air-fuel ratio sensor 40 becomes the rich air-fuel ratio. Along with this, the stored amount of oxygen of the upstream side exhaust purification catalyst 20 is also gradually reduced. At this time, the unburned gas in the exhaust gas which flows into the upstream side exhaust purification catalyst 20 is removed by oxidation by the oxygen which was stored in the upstream side exhaust purification catalyst 20. For this reason, the output air-fuel ratio of the downstream side air-fuel ratio sensor 41 becomes the stoichiometric air-fuel ratio.

At the time $t_1$, if active air-fuel ratio control is started, in the example which is shown in FIG. 7, the target air-fuel ratio is made an active control rich air-fuel ratio AFTar which is richer than the rich set air-fuel ratio AFTr. Due to this, the rich degree of the output air-fuel ratio of the upstream side air-fuel ratio sensor 40 becomes higher and the speed of decrease of the stored amount of oxygen of the upstream side exhaust purification catalyst 20 increases. At this time as well, the unburned gas in the exhaust gas which flows into the upstream side exhaust purification catalyst 20 is removed by oxidation at the upstream side exhaust purification catalyst 20, so the output air-fuel ratio of the downstream side air-fuel ratio sensor 41 becomes the stoichiometric air-fuel ratio. Note that, in the present embodiment, the active control rich air-fuel ratio AFTar is made an air-fuel ratio which is richer than the rich set air-fuel ratio AFTr, but it may also be made an air-fuel ratio which is substantially the same as the rich set air-fuel ratio or leaner than the same.

On the other hand, at the time $t_1$, if active air-fuel ratio control is started, cumulative addition of the oxygen excess/deficiency is started. As explained above, from the time $t_1$ on, the air-fuel ratio of the exhaust gas which flows into the upstream side exhaust purification catalyst 20 becomes the rich air-fuel ratio, therefore, the output air-fuel ratio of the upstream side air-fuel ratio sensor 40 becomes the rich air-fuel ratio. For this reason, from the time $t_1$ on, when trying to make the air-fuel ratio of the exhaust gas which flows into the upstream side exhaust purification catalyst 20 the stoichiometric air-fuel ratio, it can be said that the oxygen is deficient. For this reason, as shown in FIG. 7, the cumulative value of the oxygen excess/deficiency in the exhaust gas which flows into the upstream side exhaust purification catalyst 20 gradually decreases.

After that, the stored amount of oxygen of the upstream side exhaust purification catalyst 20 decreases. When the stored amount of oxygen becomes substantially zero, unburned gas starts to flow out from the upstream side exhaust purification catalyst 20. As a result, at the time $t_2$, the output air-fuel ratio of the downstream side air-fuel ratio sensor 41 reaches the rich judgment air-fuel ratio AFrefr. Therefore, in the present embodiment, at the time $t_2$, the target air-fuel ratio of the exhaust gas which flows into the upstream side exhaust purification catalyst 20 is switched from the active control rich air-fuel ratio AFTar to the active control lean air-fuel ratio AFTal. In the present embodiment, the active control lean air-fuel ratio AFTal is made an air-fuel ratio which is substantially the same as the lean set air-fuel ratio AFTl, but it may also be an air-fuel ratio which is different from this. Further, at the time $t_2$, the cumulative value of the oxygen excess/deficiency is reset to zero.

At the time $t_2$, if the target air-fuel ratio is switched, the output air-fuel ratio of the upstream side air-fuel ratio sensor 40 also changes to the lean air-fuel ratio. Further, the stored amount of oxygen of the upstream side exhaust purification catalyst 20 gradually increases. At this time, the NOx in the exhaust gas which flows into the upstream side exhaust purification catalyst 20 is removed by reduction along with the storage of oxygen. For this reason, the output air-fuel ratio of the downstream side air-fuel ratio sensor 41 converges to the stoichiometric air-fuel ratio. In addition, the output air-fuel ratio of the upstream side air-fuel ratio sensor 40 becomes the lean air-fuel ratio, so from the time $t_2$ on, when trying to make the air-fuel ratio of the exhaust gas which flows into the upstream side exhaust purification catalyst 20 the stoichiometric air-fuel ratio, it can be said that the oxygen is excessive. For this reason, as shown in FIG. 7, the cumulative value of the oxygen excess/deficiency gradually increases.

After that, the stored amount of oxygen of the upstream side exhaust purification catalyst 20 increases. When the stored amount of oxygen becomes substantially the maximum storable oxygen amount (Cmax), $NO_X$ and oxygen start to flow out from the upstream side exhaust purification catalyst 20. As a result, at the time $t_3$, the output air-fuel ratio of the downstream side air-fuel ratio sensor 41 reaches the lean judgment air-fuel ratio AFrefl which is leaner than the stoichiometric air-fuel ratio. Therefore, in the present embodiment, at the time $t_3$, the target air-fuel ratio is switched from the active control lean air-fuel ratio AFTal again to the active control rich air-fuel ratio AFTar. Further, at this time as well, the cumulative value of the oxygen excess/deficiency is reset to zero.

At the time $t_3$, if the target air-fuel ratio is switched, after that the stored amount of oxygen of the upstream side exhaust purification catalyst 20 etc. follows a similar trend as the times $t_1$ to $t_2$. At the time $t_4$, the output air-fuel ratio of the downstream side air-fuel ratio sensor 41 reaches the rich judgment air-fuel ratio AFrefr. In the present embodiment, due to this, the active air-fuel ratio control is ended and normal operation is resumed.

Here, the cumulative value of the oxygen excess/deficiency at the time $t_3$ and the cumulative value of the oxygen excess/deficiency at the time $t_4$ (more accurately the absolute values) express the maximum storable oxygen amount Cmax. Therefore, in the present embodiment, the average value of these cumulative values is calculated as the estimated value of the maximum storable oxygen amount Cmax. Further, the ECU 31 judges that the upstream side exhaust purification catalyst 20 has become abnormal due to deterioration when the thus calculated estimated value of the maximum storable oxygen amount is smaller than a predetermined lower limit storage amount. On the other hand, when the calculated estimated value of the maximum storable oxygen amount is the lower limit storage amount or more, basically it is judged that the upstream side exhaust purification catalyst 20 has not become abnormal due to deterioration.

Note that, in the above embodiment, the cumulative value of the oxygen excess/deficiency is calculated two times at the time $t_3$ and the time $t_4$. However, it is also possible to calculate the cumulative value only one time at the time $t_3$ and end the active air-fuel ratio control at the time $t_3$. Alternatively, it is possible to perform active air-fuel ratio control so as to calculate the cumulative value three times or more.

<Problems in Diagnosis for Abnormality>

In this regard, the downstream side air-fuel ratio sensor 41 sometimes also deteriorates. As a typical phenomenon which occurs in the downstream side air-fuel ratio sensor 41 due to deterioration, delayed response may be mentioned. In delayed response, a delay occurs from when the actual air-fuel ratio of the exhaust gas around the downstream side air-fuel ratio sensor 41 changes to when the output air-fuel ratio of the downstream side air-fuel ratio sensor 41 changes to match with the same. As a result, the delay in the change of the output air-fuel ratio of the downstream side air-fuel ratio sensor 41 causes a delay in the switching of the target air-fuel ratio. For this reason, despite the stored amount of oxygen of the upstream side exhaust purification catalyst 20 reaching the maximum storable oxygen amount, the target air-fuel ratio is continued at the lean air-fuel ratio as it is or despite the stored amount of oxygen reaching zero, the target air-fuel ratio is continued at the rich air-fuel ratio as it is. As a result, the apparent maximum storable oxygen amount of the upstream side exhaust purification catalyst 20 sometimes ends up being calculated larger. For this reason, if the downstream side air-fuel ratio sensor 41 suffers from delayed response, the upstream side exhaust purification catalyst 20 can no longer be accurately diagnosed for abnormality. Below, this will be explained with reference to FIG. 8.

Figure 8:
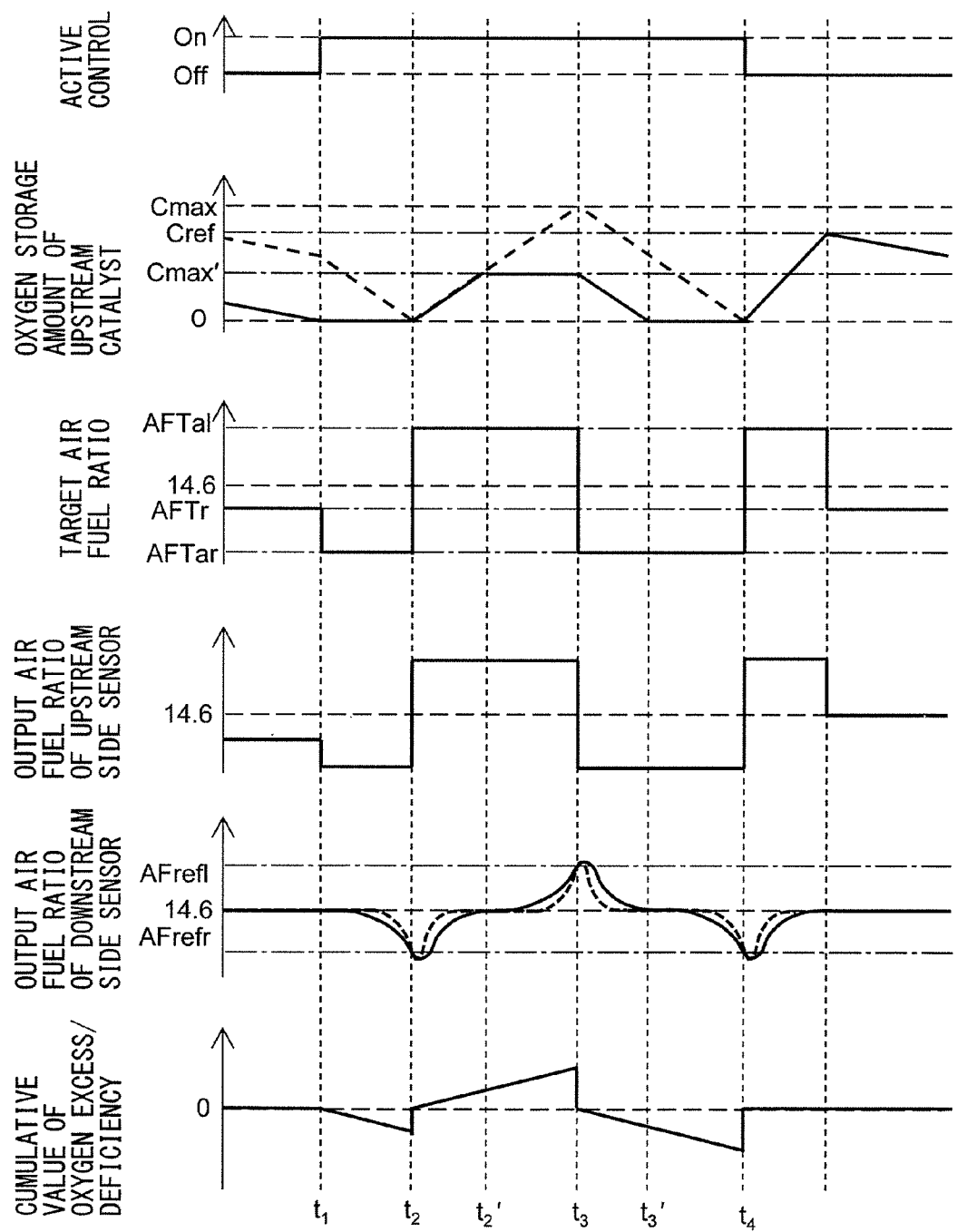
FIG. 8 is a time chart of an output air-fuel ratio of an air-fuel ratio sensor etc. when performing active control.

FIG. 8 is a view similar to FIG. 7. The solid lines in the figure show the trends in the parameters in the case where the downstream side air-fuel ratio sensor 41 suffers from delayed response, while the broken lines in the figure show the trends in the parameters in the case where delayed response does not occur (same as FIG. 7).

In the example which is shown in FIG. 8 as well, at the time $t_2$, the target air-fuel ratio is switched from the active control rich air-fuel ratio AFTar to the active control lean air-fuel ratio AFTal. If, at the time $t_2$, the target air-fuel ratio is switched, the stored amount of oxygen of the upstream side exhaust purification catalyst 20 gradually increases.

Here, in the example which is shown in FIG. 8, the maximum storable oxygen amount of the upstream side exhaust purification catalyst 20 is decreased from the maximum storable oxygen amount Cmax in the example which is shown in FIG. 7 (Cmax'). Therefore, as shown in FIG. 8, the stored amount of oxygen of the upstream side exhaust purification catalyst 20 substantially reaches the maximum storable oxygen amount Cmax' at the time $t_2$'. As a result, from the time $t_2$' on, lean air-fuel ratio exhaust gas flows out from the upstream side exhaust purification catalyst 20.

In this regard, if the downstream side air-fuel ratio sensor 41 suffers from delayed response, even if the air-fuel ratio of the exhaust gas around the downstream side air-fuel ratio sensor 41 changes to the lean air-fuel ratio, the output air-fuel ratio will not immediately change. As a result, in the example which is shown in FIG. 8, at the time $t_3$, the output air-fuel ratio of the downstream side air-fuel ratio sensor 41 reaches the lean judgment air-fuel ratio AFrefl. For this reason, the cumulative addition of the oxygen excess/deficiency is continued from the time $t_2$ to the time $t_3$' and the cumulative value at the time $t_3$' is calculated as the estimated value of the maximum storable oxygen amount.

Further, at the time $t_3$, if the output air-fuel ratio of the downstream side air-fuel ratio sensor 41 reaches the lean judgment air-fuel ratio AFrefl, the target air-fuel ratio is switched from the active control lean air-fuel ratio AFTal to the active control rich air-fuel ratio AFTar. After that, the stored amount of oxygen of the upstream side exhaust purification catalyst 20 gradually decreases. In the example which is shown in FIG. 8, it reaches substantially zero at the time $t_3$'. As a result, from the time $t_3$' on, rich air-fuel ratio exhaust gas flows out from the upstream side exhaust purification catalyst 20. In this regard, when the downstream side air-fuel ratio sensor 41 suffers from delayed response, the output air-fuel ratio does not immediately change. At the time $t_4$, the output air-fuel ratio of the downstream side air-fuel ratio sensor 41 reaches the rich judgment air-fuel ratio AFrefr. For this reason, the cumulative addition of the oxygen excess/deficiency is continued from the time $t_2$ to the time $t_4$ and the cumulative value at the time $t_4$ is calculated as the estimated value of the maximum storable oxygen amount.

As a result, when the downstream side air-fuel ratio sensor 41 suffers from delayed response, the maximum storable oxygen amount of the upstream side exhaust purification catalyst 20 ends up being calculated larger than the actual maximum storable oxygen amount. In this case, despite the upstream side exhaust purification catalyst 20 becoming abnormal due to deterioration, there is the possibility that the upstream side exhaust purification catalyst 20 will end up being diagnosed as not becoming abnormal.

<Diagnosis for Abnormality in Present Embodiment>

In this regard, when performing active air-fuel ratio control, depending on whether or not the downstream side air-fuel ratio sensor 41 suffers from delayed response, the time period during which the output air-fuel ratio is near the stoichiometric air-fuel ratio will change. This state is shown in FIG. 9.

Figure 9:
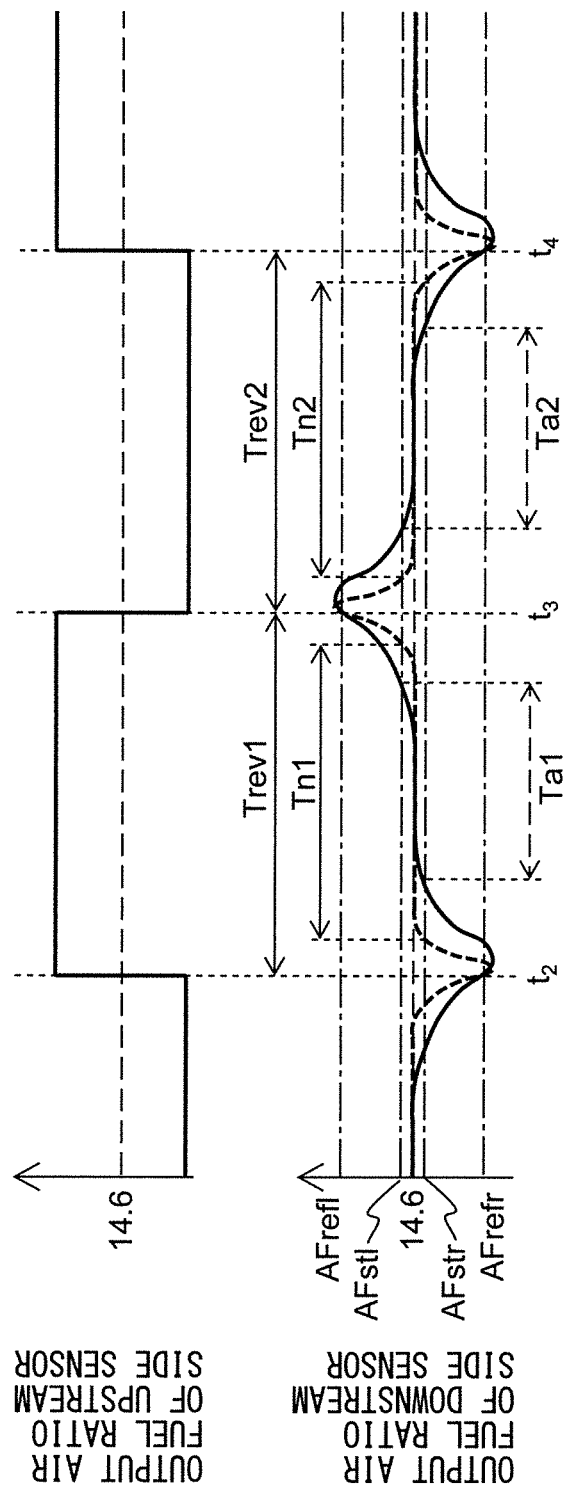
FIG. 9 is a time chart of an output air-fuel ratio of an air-fuel ratio sensor etc. when performing active control.

FIG. 9 is a time chart of the output air-fuel ratios of the upstream side air-fuel ratio sensor 40 and the downstream side air-fuel ratio sensor 41 from the times $t_2$ to $t_4$ of FIG. 8. In the example which is shown in FIG. 9 as well, at the time $t_2$, the output air-fuel ratio of the downstream side air-fuel ratio sensor 41 reaches the rich judgment air-fuel ratio AFrefr and the target air-fuel ratio is switched from the rich air-fuel ratio to the lean air-fuel ratio. Further, at the time $t_3$, the output air-fuel ratio of the downstream side air-fuel ratio sensor 41 reaches the lean judgment air-fuel ratio AFrefl and the target air-fuel ratio is switched from the lean air-fuel ratio to the rich air-fuel ratio. Note that, in the following explanation, the time period (in the figure, Trev1) from the time $t_2$ when the output air-fuel ratio of the downstream side air-fuel ratio sensor 41 reaches the rich judgment air-fuel ratio AFrefr to the time $t_3$ when the output air-fuel ratio reaches the lean judgment air-fuel ratio AFrefl will be referred to as the "rich-lean air-fuel ratio reversal time period". Similarly, the time period (in the figure, Trev2) from the time $t_3$ when the output air-fuel ratio of the downstream side air-fuel ratio sensor 41 reaches the lean judgment air-fuel ratio AFrefl to the time $t_4$ when the output air-fuel ratio reaches the rich judgment air-fuel ratio AFrefr will be referred to as the "lean-rich air-fuel ratio reversal time period". Further, the rich-lean air-fuel ratio reversal time period and the lean-rich air-fuel ratio reversal time period will together be simply referred to as the "air-fuel ratio reversal time period".

Here, the case where the output air-fuel ratio of the downstream side air-fuel ratio sensor 41 is in a predetermined range nearer the stoichiometric air-fuel ratio than the range from the rich judgment air-fuel ratio AFrefr to the lean judgment air-fuel ratio AFrefl is defined as the output air-fuel ratio satisfying the stoichiometric air-fuel ratio judgment condition. Specifically, in the present embodiment, when the output air-fuel ratio is between the stoichiometric judgment rich air-fuel ratio AFstr which is slightly richer than the stoichiometric air-fuel ratio and the stoichiometric judgment lean air-fuel ratio AFstl which is slightly leaner than the stoichiometric air-fuel ratio, it is considered that the stoichiometric air-fuel ratio judgment condition is satisfied. Here, the stoichiometric judgment rich air-fuel ratio AFstr is made the air-fuel ratio between the rich judgment air-fuel ratio AFrefr and the stoichiometric air-fuel ratio, while the stoichiometric judgment lean air-fuel ratio AFstl is made the air-fuel ratio between the lean judgment air-fuel ratio AFrefl and the stoichiometric air-fuel ratio. Alternatively, when the output air-fuel ratio is between these air-fuel ratios AFstr and AFstl and, in addition, the rate of change along with time of the output air-fuel ratio (that is, the differential value of the output air-fuel ratio) is a predetermined value or less, it may be deemed that the stoichiometric air-fuel ratio judgment condition is satisfied. Whatever the case, it means the case where the output air-fuel ratio satisfies the stoichiometric air-fuel ratio judgment condition and the case where the output air-fuel ratio remains near the stoichiometric air-fuel ratio.

The broken lines in FIG. 9 show the output air-fuel ratio in the case where the downstream side air-fuel ratio sensor 41 has not become abnormal due to delayed response. As will be understood from FIG. 9, in the case shown by the broken lines, during the air-fuel ratio reversal time period Trev1, the time period Tn1 during which the output air-fuel ratio satisfies the stoichiometric air-fuel ratio judgment condition is relatively long. In the same way, in the air-fuel ratio reversal time period Trev2 as well, the time period Tn2 during which the output air-fuel ratio satisfies the stoichiometric air-fuel ratio judgment condition is also relatively long.

On the other hand, the solid lines in FIG. 9 express the output air-fuel ratio in the case where the downstream side air-fuel ratio sensor 41 has become abnormal due to delayed response and the maximum storable oxygen amount of the upstream side exhaust purification catalyst 20 decreases. As will be understood from FIG. 9, in the case shown by the solid lines, during the air-fuel ratio reversal time period Trev1, the time period Ta1 during which the output air-fuel ratio satisfies the stoichiometric air-fuel ratio judgment condition is shorter compared with the time period Tn1. In the same way, in the air-fuel ratio reversal time period Trev2 as well, the time period Tat during which the output air-fuel ratio satisfies the stoichiometric air-fuel ratio judgment condition is shorter compared with the time period Tn2. This is due to the fact that the downstream side air-fuel ratio sensor 41 suffers from delayed response so time is taken for the output air-fuel ratio to reach the judgment air-fuel ratios AFrefr and AFrefl from near the stoichiometric air-fuel ratio. Therefore, in such a case, even if the maximum storable oxygen amount which is calculated in the above way is the lower limit storage amount or more, the upstream side exhaust purification catalyst 20 becomes abnormal.

Therefore, in the present embodiment, even if the maximum storable oxygen amount which is calculated in the above way is the lower limit storage amount or more, when the ratio of the time period during which the output air-fuel ratio satisfies the stoichiometric air-fuel ratio judgment condition in the air-fuel ratio reversal time period (below, called "the stoichiometric air-fuel ratio time period ratio") is a predetermined reference value or less, it is judged that the upstream side exhaust purification catalyst 20 has become abnormal. In addition, at such a time, it may be judged that the downstream side air-fuel ratio sensor 41 has become abnormal due to delayed response. Conversely, when the stoichiometric air-fuel ratio time period ratio is larger than a reference value, it is judged that the upstream side exhaust purification catalyst 20 has not become abnormal.

Figure 10:
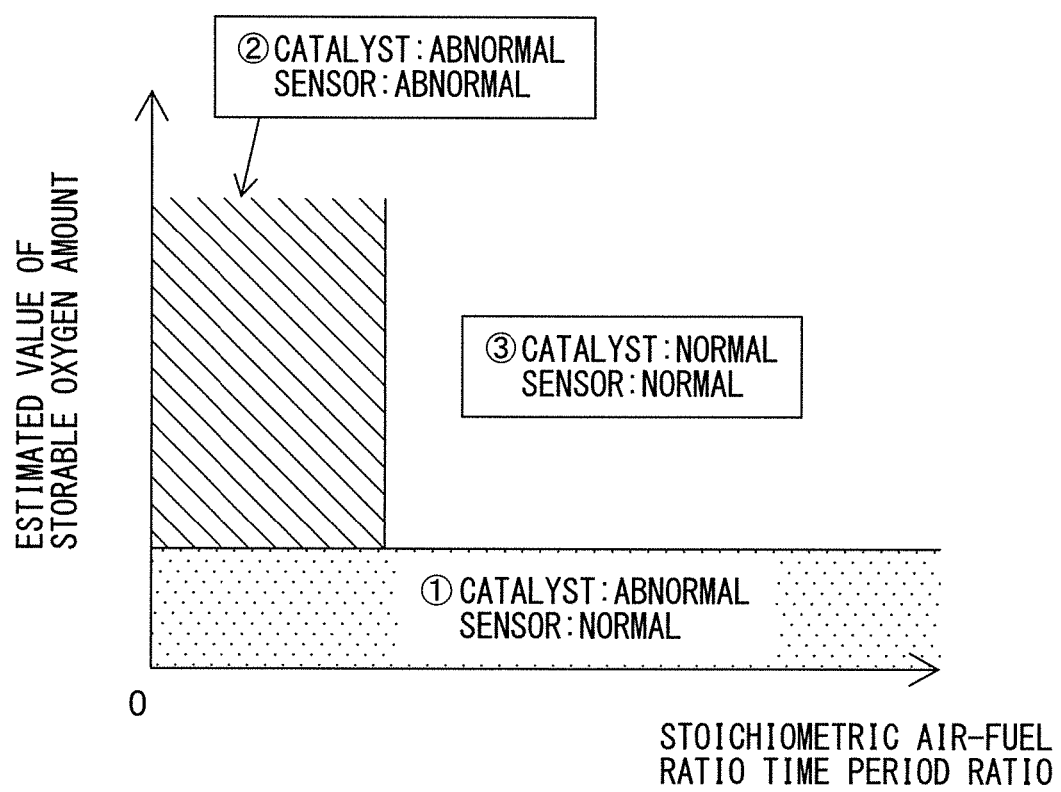
FIG. 10 is a view which shows the relationship between a stoichiometric air-fuel ratio time period ratio and an estimated value of the maximum storable oxygen amount and judgment of abnormality.

FIG. 10 is a view which shows the relationship between the stoichiometric air-fuel ratio time period ratio and the estimated value of the maximum storable oxygen amount and judgment of abnormality. As shown in FIG. 10, in the present embodiment, when the estimated value of the maximum storable oxygen amount is smaller than the lower limit storage amount, regardless of the stoichiometric air-fuel ratio time period ratio, it is judged that the upstream side exhaust purification catalyst 20 has become abnormal (region 1 of FIG. 10). Further, at this time, it may be judged that the downstream side air-fuel ratio sensor 41 has not become abnormal.

On the other hand, if the estimated value of the maximum storable oxygen amount is the lower limit storage amount or more, when the time period ratio of the stoichiometric air-fuel ratio is small, it is judged that the upstream side exhaust purification catalyst 20 has become abnormal (region 2 of FIG. 10). Further, at this time, it may be judged that the downstream side air-fuel ratio sensor 41 has become abnormal.

In particular, in the present embodiment, when the time period ratio of the stoichiometric air-fuel ratio is the reference value or less, it is judged that the upstream side exhaust purification catalyst 20 has become abnormal, but this reference value, as shown in FIG. 10, is made a constant value regardless of the estimated value of the maximum storable oxygen amount.

Further, when the estimated value of the maximum storable oxygen amount is the lower limit storage amount or more and the time period ratio of the stoichiometric air-fuel ratio is larger than a reference value, the upstream side exhaust purification catalyst 20 is judged to be normal (region 3 of FIG. 10). Further, at this time, it is also possible to judge that the downstream side air-fuel ratio sensor 41 is normal.

In the above way, in the present embodiment, the upstream side exhaust purification catalyst 20 is diagnosed for abnormality while considering that the downstream side air-fuel ratio sensor 41 has become abnormal. For this reason, according to the present embodiment, the upstream side exhaust purification catalyst 20 can be accurately diagnosed for abnormality. In addition, in the present embodiment, in performing diagnosis for abnormality, the target air-fuel ratio does not have to be switched several times between the rich air-fuel ratio and the lean air-fuel ratio due to active air-fuel ratio control. For this reason, according to the present embodiment, the upstream side exhaust purification catalyst 20 can be quickly diagnosed for abnormality.

Note that, in the example which is shown in FIGS. 8 and 9, two air-fuel ratio reversal time periods Trev1 and Trev2 are obtained by causing the target air-fuel ratio to reverse two times (times $t_2$ and $t_3$) in the active air-fuel ratio control. However, if one air-fuel ratio reversal time period is obtained, the above-mentioned abnormality diagnosis can be performed, so in active air-fuel ratio control, the target air-fuel ratio may also be reversed just once.

Alternatively, in the active air-fuel ratio control, the target air-fuel ratio may be reversed a large number of times to diagnose abnormality based on the measured values in a large number of air-fuel ratio reversal time periods. In this case, in the present embodiment, the stoichiometric air-fuel ratio time period ratio is calculated based in the total value of the plurality of air-fuel ratio reversal time periods and the total value of the plurality of time periods among these plurality of air-fuel ratio reversal time periods where the output air-fuel ratio satisfies the stoichiometric air-fuel ratio judgment condition.

Further, in the above embodiment, the estimated value of the maximum storable oxygen amount etc. in the air-fuel ratio reversal time period Trev1 when the target air-fuel ratio is a lean air-fuel ratio and in the air-fuel ratio reversal time period Trev2 when the target air-fuel ratio is a rich air-fuel ratio are used as the basis for diagnosis for abnormality. However, it is also possible to use the estimated value of the maximum storage oxygen amount in only one time period of the two time periods for diagnosis for abnormality. That is, it is also possible to calculate the estimated value of the maximum storable oxygen amount etc. in only the air-fuel ratio reversal time period from when the output air-fuel ratio of the downstream side air-fuel ratio sensor 41 changes from the rich judgment air-fuel ratio to the lean judgment air-fuel ratio (that is, Trev1) and use this estimated value etc. as the basis for diagnosis for abnormality. Alternatively, it is also possible to calculate the estimated value of the maximum storable oxygen amount etc. in only the air-fuel ratio reversal time period from when the output air-fuel ratio of the downstream side air-fuel ratio sensor 41 changes from the lean judgment air-fuel ratio to the rich judgment air-fuel ratio (that is, Trev2) and to use this estimated value etc. as the basis for diagnosis for abnormality.

Note that, when the downstream side air-fuel ratio sensor 41 is not abnormal due to response delay and the actual air-fuel ratio changes from the lean air-fuel ratio to the stoichiometric air-fuel ratio, almost no delay occurs in the output air-fuel ratio for this. In this regard, even when not abnormal due to delayed response, when the actual air-fuel ratio changes from the rich air-fuel ratio to the stoichiometric air-fuel ratio, delay occurs in the output air-fuel ratio for this. For this reason, it is preferable to calculate the estimated value of the maximum storable oxygen amount etc. in only the air-fuel ratio reversal time period during which the output air-fuel ratio of the downstream side air-fuel ratio sensor 41 changes from a lean judgment air-fuel ratio to a rich judgment air-fuel ratio (that is, Trev2) and to use this estimated value etc. as the basis for abnormality diagnosis.

Further, in the above embodiment, the reference value is made a predetermined value. However, the reference value may also be changed in accordance with the estimated value of the maximum storable oxygen amount and may be changed in accordance with parameters other than the estimated value of the maximum storable oxygen amount.

In addition, in the above embodiment, the stoichiometric air-fuel ratio time period ratio is used as the basis for diagnosis for abnormality. However, in the air-fuel ratio reversal time period, the time period during which the output air-fuel ratio of the downstream side air-fuel ratio sensor 41 satisfies the stoichiometric air-fuel ratio judgment condition can be used as the basis for diagnosis for abnormality. In this case, when the time period during which the output air-fuel ratio satisfies the stoichiometric air-fuel ratio judgment condition in the air-fuel ratio reversal time period is a predetermined reference value or less, it is judged that the downstream side air-fuel ratio sensor 41 has become abnormal due to delayed response.

<Flow Chart>

Figure 11:
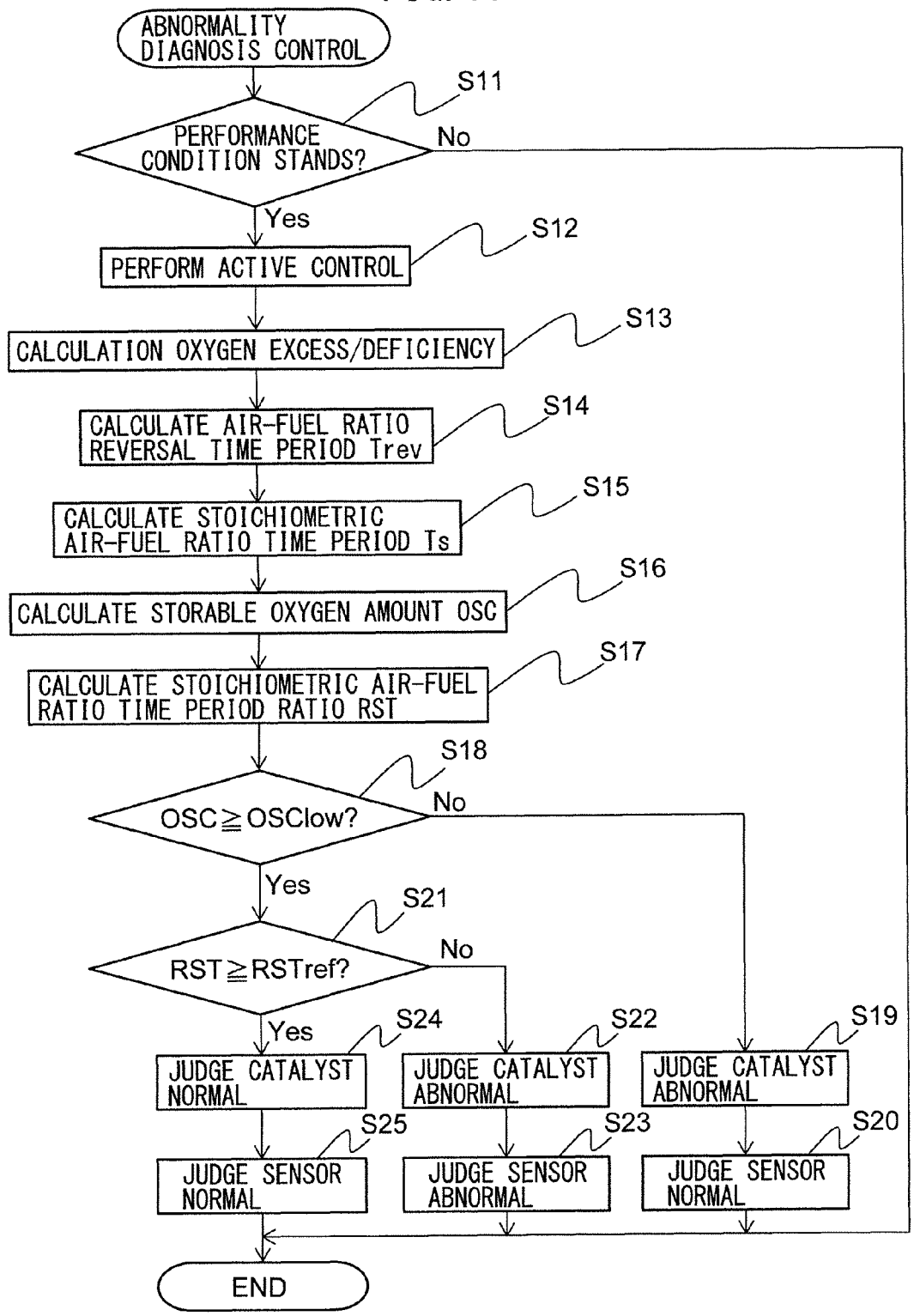
FIG. 11 is a flow chart which schematically shows a control routine of abnormality diagnosis control in the present embodiment.

FIG. 11 is a flow chart which schematically shows the control routine of the abnormality diagnosis control in the present embodiment. As shown in FIG. 11, first, at step S11, it is judged if the condition for performing abnormality diagnosis control stands. The condition for performing abnormality diagnosis control stands when, for example, the temperature of the upstream side exhaust purification catalyst 20 is the activation temperature or more and both the air-fuel ratio sensors 40 and 41 are in the active state. When it is judged at step S11 that the condition for performing abnormality diagnosis control does not stand, the control routine is ended. On the other hand, when it is judged that the condition for performing abnormality diagnosis control stands, the routine proceeds to step S12. At step S12, active air-fuel ratio control is performed. Therefore, the target air-fuel ratio of the exhaust gas which flows into the upstream side exhaust purification catalyst 20 is set to the rich set air-fuel ratio AFTr or lean set air-fuel ratio AFTl or alternatively alternately to these air-fuel ratios.

Next, at step S13, the output air-fuel ratio of the upstream side air-fuel ratio sensor 40 and the output value of the air flow meter 39 etc. at the time of performing active air-fuel ratio control are used as the basis to calculate the oxygen excess/deficiency. Next, at step S14, the output air-fuel ratio of the downstream side air-fuel ratio sensor 41 at the time of performing active air-fuel ratio control is used as the basis to calculate the air-fuel ratio reversal time period Trev. At step S15, the output air-fuel ratio of the downstream side air-fuel ratio sensor 41 at the time of performing active air-fuel ratio control is used as the basis to calculate the stoichiometric air-fuel ratio time period Ts (FIG. 9, Tn or Ta). Next, at step S16, the cumulative value of the oxygen excess/deficiency which was calculated at step S13 is used as the basis to calculate the estimated value of the maximum storable oxygen amount OSC of the upstream side exhaust purification catalyst 20. Note that, when the target air-fuel ratio is reversed several times in the active air-fuel ratio control, the average value of the plurality of cumulative values of the calculated oxygen excess/deficiency is made the final estimated value of the maximum storable oxygen amount OSC.

Next, at step S17, the air-fuel ratio reversal time period Trev which is calculated at step S14 (in case of reversal a plurality of times, the total value) and the stoichiometric air-fuel ratio time period Ts which is calculated at step S15 (in case of reversal a plurality of times, the total value) are used as the basis to calculate the stoichiometric air-fuel ratio time period ratio RST (=Ts/Trev). Note that, when the target air-fuel ratio is inverted a plurality of times in active air-fuel ratio control, the average value of the stoichiometric air-fuel ratio time period ratios which are calculated for the different air-fuel ratio reversal time periods is made the final stoichiometric air-fuel ratio time period ratio.

Next, at step S18, it is judged if the maximum storable oxygen amount OSC which was calculated at step S16 is the lower limit storage amount OSClow or more. When it is judged at step S18 that the maximum storable oxygen amount OSC is smaller than the lower limit storage amount OSClow, the routine proceeds to step S19. At step S19, it is judged that the upstream side exhaust purification catalyst 20 has become abnormal and, for example, a warning light which shows the upstream side exhaust purification catalyst 20 has become abnormal is lit at the vehicle which mounts the internal combustion engine. Next, at step S20, it is judged that the downstream side air-fuel ratio sensor 41 is normal and the control routine is ended.

On the other hand, when it is judged at step S18 that the maximum storable oxygen amount OSC is the lower limit storage amount OSClow or more, the routine proceeds to step S21. At step S21, it is judged if the stoichiometric air-fuel ratio time period ratio RST is the reference value RSTref or more. At this time, the reference value RSTref is calculated based on the maximum storable oxygen amount OSC which was calculated at step S16 using the map such as shown in FIG. 10. When, at step S21, it is judged that the stoichiometric air-fuel ratio time period ratio RST is smaller than the reference value RSTref, the routine proceeds to step S22. At step S22, it is judged that the upstream side exhaust purification catalyst 20 has become abnormal and, as a result, for example, a warning light indicating that the upstream side exhaust purification catalyst 20 is abnormal is lit. Next, at step S23, it is judged that the downstream side air-fuel ratio sensor 41 has also become abnormal and, for example, a warning light indicating that the downstream side air-fuel ratio sensor 41 is abnormal is lit. After that, the control routine is ended.

On the other hand, when, at step S21, it is judged that the stoichiometric air-fuel ratio time period ratio RST is the reference value RSTref or more, the routine proceeds to step S24. At step S24, it is judged that the upstream side exhaust purification catalyst 20 is normal. Next, at step S25, it is judged that the downstream side air-fuel ratio sensor 41 is also normal and the control routine is ended.

Second Embodiment

Next, referring to FIG. 12 and FIG. 13, a second embodiment of the present invention will be explained. The configuration etc. of the abnormality diagnosis system in the second embodiment are basically similar to the configuration etc. of the abnormality diagnosis system in the first embodiment. Here, in the abnormality diagnosis system in the first embodiment, the estimated values of the maximum storable oxygen amount etc. in the two time periods of the air-fuel ratio reversal time period Trev1 when the target air-fuel ratio is the lean air-fuel ratio and the air-fuel ratio reversal time period Trev2 when the target air-fuel ratio is the rich air-fuel ratio were used as the basis for the diagnosis for abnormality. However, in the second embodiment, the estimated value of the maximum storable oxygen amount etc. in just one time period among these two time periods is used as the basis for the diagnosis for abnormality. In addition, in the first embodiment, the ratio of time between the air-fuel ratio reversal time period and the time period during which the output air-fuel ratio satisfies the stoichiometric air-fuel ratio judgment condition was used as the basis for the diagnosis for abnormality. However, in the second embodiment, the cumulative oxygen excess/deficiency values in the two time periods are used as the basis for the diagnosis for abnormality.

Figure 12:
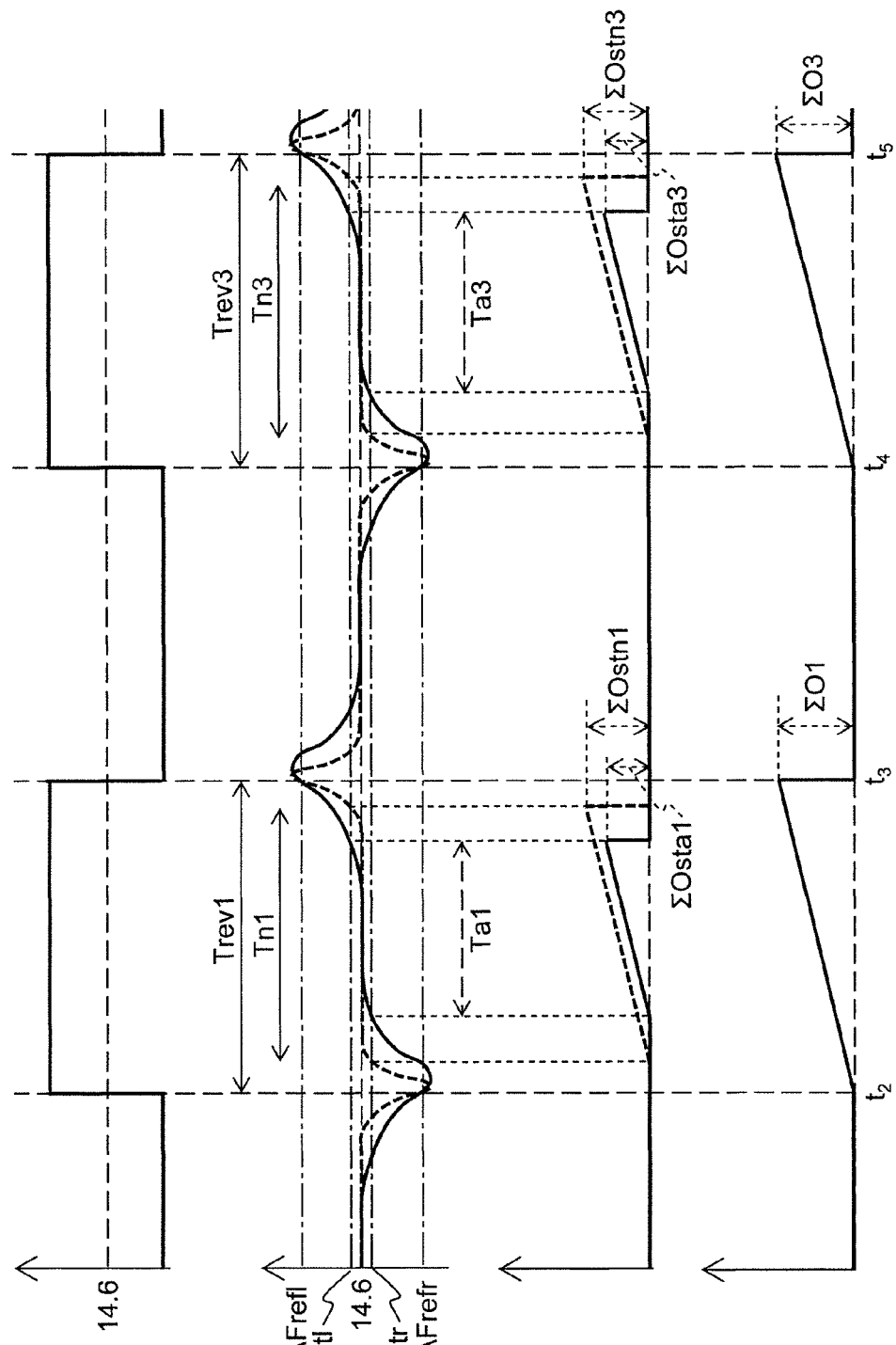
FIG. 12 is a time chart of an output air-fuel ratio of an air-fuel ratio sensor etc. when performing active control.

FIG. 12 is a time chart, similar to FIG. 9, of the output air-fuel ratios of the upstream side air-fuel ratio sensor 40 and the downstream side air-fuel ratio sensor 41, the cumulative oxygen excess at the stoichiometric air-fuel ratio, and the cumulative oxygen excess. In the example which is shown in FIG. 12 as well, in the same way as FIG. 9, at the time $t_2$, the output air-fuel ratio of the downstream side air-fuel ratio sensor 41 reaches the rich judgment air-fuel ratio AFrefr and the target air-fuel ratio is switched from the rich air-fuel ratio to the lean air-fuel ratio. Further, at the time $t_3$, the output air-fuel ratio of the downstream side air-fuel ratio sensor 41 reaches the lean judgment air-fuel ratio AFrefl and the target air-fuel ratio is switched from the lean air-fuel ratio to the rich air-fuel ratio. Further, in the same way as in FIG. 9, the broken lines in FIG. 12 show the output air-fuel ratio etc. in the case where the downstream side air-fuel ratio sensor 41 has not become abnormal due to delayed response. In addition, in the same way as FIG. 9, the solid lines in FIG. 12 show the output air-fuel ratio etc. in the case where the air-fuel ratio sensor 41 has become abnormal due to delayed response and the maximum storable oxygen amount of the upstream side exhaust purification catalyst 20 decreases.

As shown in FIG. 12, in the present embodiment, at the time $t_2$, if the target air-fuel ratio is switched from a rich setting air-fuel ratio AFTr to a lean setting air-fuel ratio AFTl, the cumulative oxygen excess/deficiency is reset to zero. After that, the oxygen excess/deficiency is cumulatively added until the time $t_3$ when the target air-fuel ratio is switched from the lean setting air-fuel ratio AFTl to AFTr. That is, in the present embodiment, the cumulative oxygen excess/deficiency in the rich-lean air-fuel ratio reversal time period (Trev1 in the figure) (note that, in FIG. 12, the amount of oxygen excess is shown) is calculated. In the example which is shown in FIG. 12, the cumulative oxygen excess/deficiency in the air-fuel ratio reversal time period Trev1 becomes ΣO1.

In addition, in the present embodiment, in the rich-lean air-fuel ratio reversal time period Trev1, if the output air-fuel ratio satisfies the stoichiometric air-fuel ratio judgment condition, the cumulative addition of the oxygen excess/deficiency at the stoichiometric air-fuel ratio (below, referred to as the "stoichiometric air-fuel ratio excess/deficiency") is started. In the example which is shown in FIG. 12, specifically, when the output air-fuel ratio of the downstream side air-fuel ratio sensor 41 becomes the stoichiometric judgment rich air-fuel ratio AFstr or more, the cumulative addition of the stoichiometric air-fuel ratio excess/deficiency is started. On the other hand, at the rich-lean air-fuel ratio reversal time period Trev1, if the output air-fuel ratio no longer satisfies the stoichiometric air-fuel ratio judgment condition, the cumulative addition of the stoichiometric air-fuel ratio excess/deficiency is suspended. In the example which is shown in FIG. 12, specifically, if the output air-fuel ratio of the downstream side air-fuel ratio sensor 41 becomes larger than the stoichiometric judgment lean air-fuel ratio, the cumulative addition of the stoichiometric air-fuel ratio excess/deficiency is suspended. That is, in the present embodiment, in the rich-lean air-fuel ratio reversal time period, the cumulative value of the oxygen excess/deficiency in the period where the output air-fuel ratio satisfies the stoichiometric air-fuel ratio judgment condition (below, referred to as the "stoichiometric air-fuel ratio cumulative excess/deficiency") is calculated. In the example which is shown in FIG. 12, when the downstream side air-fuel ratio sensor 41 has not become abnormal (broken line in figure), the stoichiometric air-fuel ratio cumulative excess/deficiency becomes ΣOstn1. On the other hand, when the downstream side air-fuel ratio sensor 41 has become abnormal (solid line in figure), the stoichiometric air-fuel ratio cumulative excess/deficiency becomes ΣOsta1. As will be understood from FIG. 12, the stoichiometric air-fuel ratio cumulative excess/deficiency ΣOsta1 is smaller compared with the stoichiometric air-fuel ratio cumulative excess/deficiency ΣOstn1.

Furthermore, in the example which is shown in FIG. 12, the cumulative oxygen excess/deficiency is calculated (ΣO3) even in the separate rich-lean air-fuel ratio reversal time period Trev3 at the times $t_4$ to $t_5$. In addition, even in this rich-lean air-fuel ratio reversal time period Trev3, the stoichiometric air-fuel ratio cumulative excess/deficiency values are calculated (ΣOstn3 and ΣOsta3 in figure).

In the present embodiment, the thus calculated cumulative oxygen excess/deficiency values ΣO1, ΣO3, . . . in the rich-lean air-fuel ratio reversal time period are totaled up or their average value is calculated. In addition, in the present embodiment, the stoichiometric air-fuel ratio cumulative excess/deficiency values ΣOst1, ΣOst2, . . . are totaled up or their average value is calculated. After that, the ratio of the total value or the average value of the stoichiometric air-fuel ratio cumulative excess/deficiency values to the total value or average value of the cumulative oxygen excess/deficiency values is calculated as the ratio of the amount of oxygen at the stoichiometric air-fuel ratio. Further, when the thus calculated stoichiometric air-fuel ratio oxygen ratio is a predetermined reference value or less, it is judged that the upstream side exhaust purification catalyst 20 has become abnormal. In addition, at such a time, it may be judged that the downstream side air-fuel ratio sensor 41 has become abnormal due to delayed response. Conversely, when the stoichiometric air-fuel ratio oxygen ratio is larger than the reference value, it is judged that the upstream side exhaust purification catalyst 20 has not become abnormal.

Figure 13:
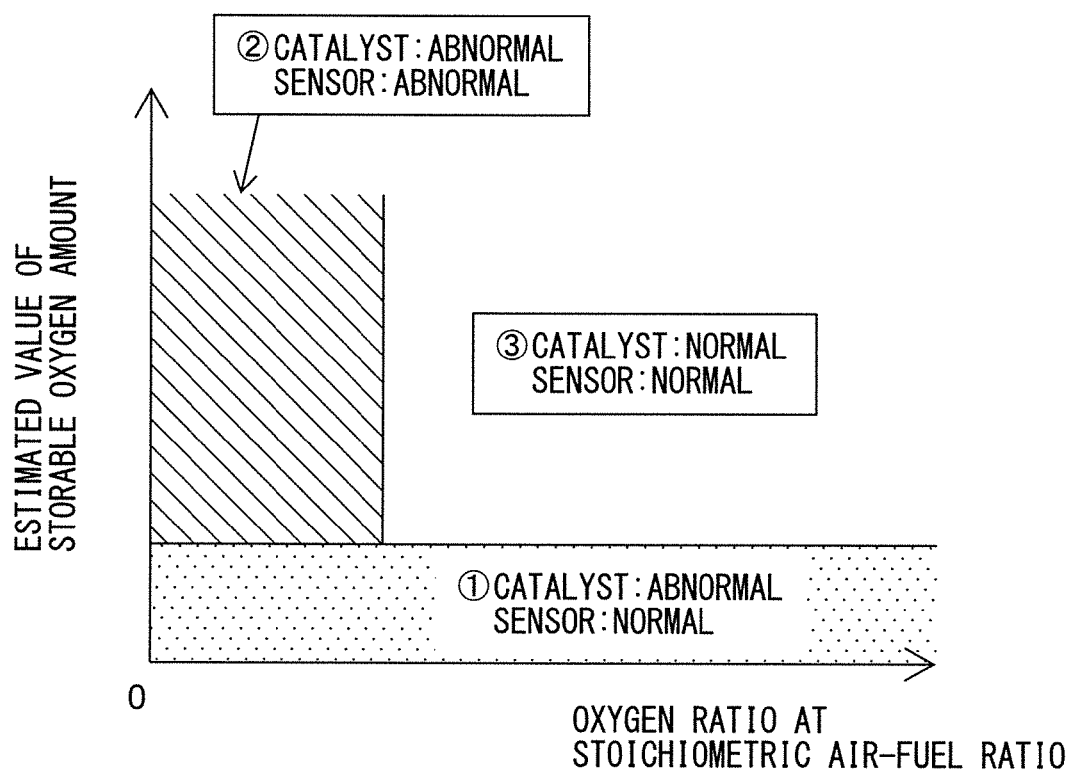
FIG. 13 is a view which shows the relationship between a stoichiometric air-fuel ratio oxygen ratio and an estimated value of the maximum storable oxygen amount and judgment of abnormality.

FIG. 13 is a view which shows the relationship between the stoichiometric air-fuel ratio oxygen ratio and the estimated value of the maximum storable oxygen amount and abnormality judgment. Basically, even in the present embodiment, abnormality is judged in the same way as the example which is shown in FIG. 10. Therefore, in the region 1 of FIG. 13, it is judged that the upstream side exhaust purification catalyst 20 has become abnormal but that the downstream side air-fuel ratio sensor 41 has not become abnormal. Further, in the region 2, it is judged that both the upstream side exhaust purification catalyst 20 and the downstream side air-fuel ratio sensor 41 have become abnormal. Furthermore, in the region 3, it is judged that neither the upstream side exhaust purification catalyst 20 nor the downstream side air-fuel ratio sensor 41 have become abnormal.

In the above way, in the present embodiment, the ratio of the cumulative oxygen excess/deficiency in the air-fuel ratio reversal time period and the cumulative oxygen excess/deficiency in the time period when the output air-fuel ratio of the downstream side air-fuel ratio sensor 41 satisfies the stoichiometric air-fuel ratio judgment condition is used as the basis for the above diagnosis. In this way, instead of the time in the air-fuel ratio reversal time period, it is also possible to use the oxygen excess/deficiency in the air-fuel ratio reversal time period so as to accurately diagnose the upstream side exhaust purification catalyst 20 for abnormality.

Note that, in the first embodiment and the second embodiment, the time or cumulative oxygen excess/deficiency in the air-fuel ratio reversal time period is used as the basis for diagnosis of the upstream side exhaust purification catalyst 20 for abnormality. However, instead of these, the cumulative value of the flow rate of exhaust gas which flows into the upstream side exhaust purification catalyst 20, that is, the cumulative value of the amount of intake air which is fed to the engine body 1, may be used.

Further, in the present embodiment, only the cumulative oxygen excess/deficiency in the rich-lean air-fuel ratio reversal time period is used as the basis for diagnosis of the upstream side exhaust purification catalyst 20 for of abnormality. Here, between the rich-lean air-fuel ratio reversal time period and the lean-rich air-fuel ratio reversal time period, even if the degree of deterioration of the upstream side exhaust purification catalyst 20 is the same, the ratio of the cumulative oxygen excess/deficiency or the ratio of the time will not necessarily match. For this reason, by using only the cumulative oxygen excess/deficiency in the rich-lean air-fuel ratio reversal time period as the basis for diagnosis for abnormality, more accurate diagnosis of the upstream side exhaust purification catalyst 20 for abnormality becomes possible.

Note that, in the above embodiment, only the cumulative oxygen excess/deficiency in the rich-lean air-fuel ratio reversal time period was used as the basis for diagnosis for abnormality, but only the time in that time period or the cumulative amount of intake air may also be used as the basis for diagnosis for abnormality. Further, only the cumulative oxygen excess/deficiency in the lean-rich air-fuel ratio reversal time period, time, or cumulative amount of intake air may also be used as the basis for diagnosis for abnormality.

Third Embodiment

Next, referring to FIG. 14 and FIG. 15, a third embodiment of the present invention will be explained. The configuration etc. of the abnormality diagnosis system in the third embodiment are basically similar to the configuration etc. of the abnormality diagnosis system in the first embodiment. However, in the abnormality diagnosis system in the third embodiment, the amount of change with time of the output air-fuel ratio of the downstream side air-fuel ratio sensor 41 in the active air-fuel ratio control is also used as the basis for diagnosis for abnormality.

Figure 14:
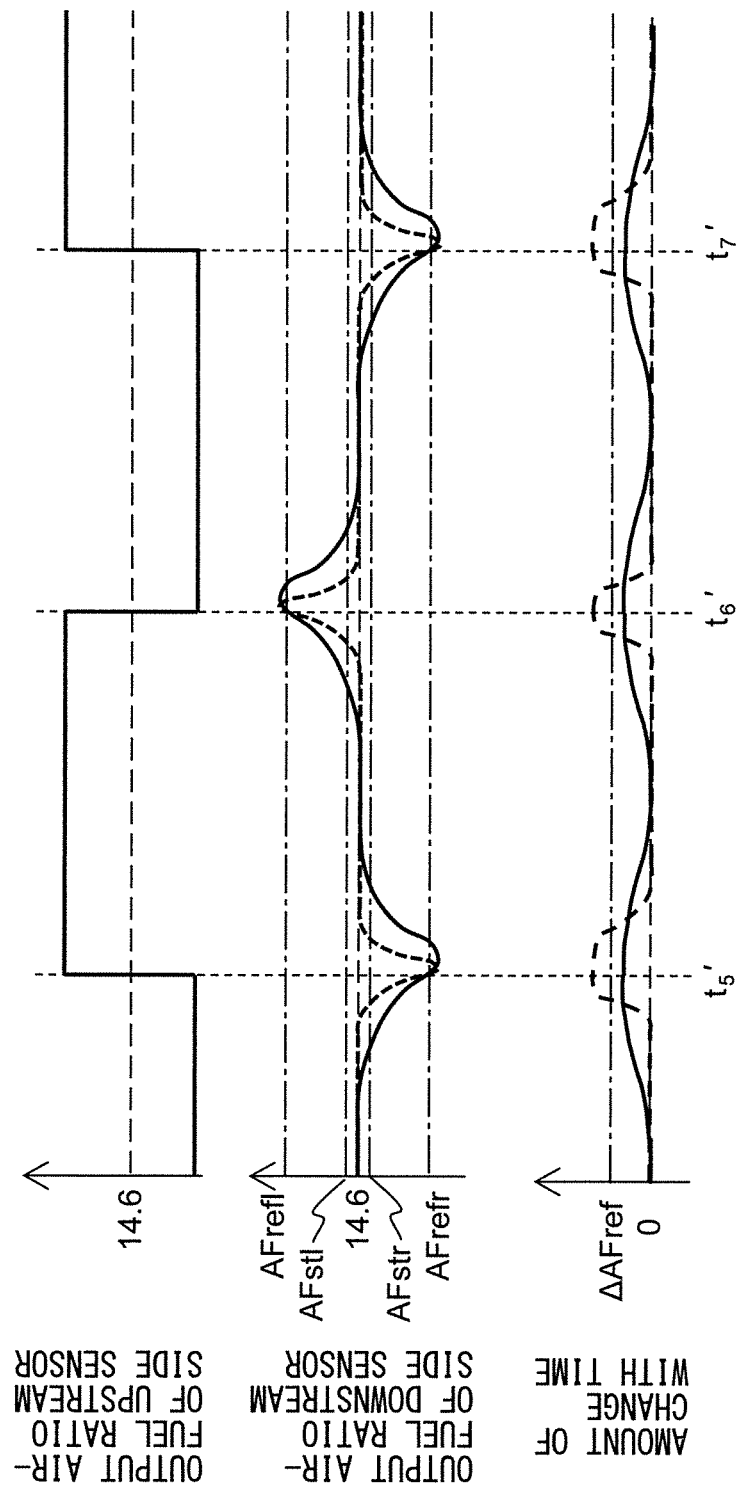
FIG. 14 is a time chart of an output air-fuel ratio of an air-fuel ratio sensor etc. when performing active control.

FIG. 14 is a time chart of the output air-fuel ratio of the upstream side air-fuel ratio sensor 40 and the output air-fuel ratio of the downstream side air-fuel ratio sensor 41 from the times $t_2$ to $t_4$ of FIG. 8 and the amount of change with time of the same and is a view similar to FIG. 9. As will be understood from FIG. 14, when the downstream side air-fuel ratio sensor 41 does not suffer from delayed response (case of broken lines in figure), the output air-fuel ratio rapidly changes along with the change of the actual air-fuel ratio. For this reason, near the times $t_2$, $t_3$, and $t_4$, the amount of change with time of the output air-fuel ratio becomes a relatively large value.

On the other hand, when the downstream side air-fuel ratio sensor 41 suffers from delayed response (case of solid lines in figure), the output air-fuel ratio gradually changes after the actual air-fuel ratio changes. For this reason, even near the times $t_2$, $t_3$, and $t_4$, the amount of change with time of the output air-fuel ratio becomes a relatively small value.

Therefore, in the present embodiment, in addition to diagnosis for abnormality based on the above-mentioned stoichiometric air-fuel ratio time period ratio, diagnosis for abnormality is performed based on the amount of change with time of the output air-fuel ratio of the downstream side air-fuel ratio sensor 41. Specifically, during the air-fuel ratio reversal time period or alternatively during performance of active air-fuel ratio control, when the maximum value ΔAFmax of the amount of change with time is the reference amount of change ΔAFref or less, it is judged that the upstream side exhaust purification catalyst 20 has become abnormal. At such a time, it may be judged that the downstream side air-fuel ratio sensor 41 has become abnormal due to delayed response.

FIG. 15 is a view which shows the relationship between the maximum value of the amount of change with time and the estimated value of the maximum storable oxygen amount and abnormality judgment. As shown in FIG. 15, in the present embodiment as well, when the estimated value of the maximum storable oxygen amount is smaller than the lower limit storage amount, regardless of the maximum value of the amount of change with time, it is judged that the upstream side exhaust purification catalyst 20 has become abnormal (region 1 of FIG. 15).

On the other hand, if the estimated value of the maximum storable oxygen amount is the lower limit storage amount or more, when the maximum value of the amount of change with time is small, it is judged that the upstream side exhaust purification catalyst 20 has become abnormal (region 2 of FIG. 15). Further, at this time, it may be judged that the downstream side air-fuel ratio sensor 41 has become abnormal.

In particular, in the present embodiment, when the maximum value of the amount of change with time is the reference amount of change or less, it is judged that the upstream side exhaust purification catalyst 20 has become abnormal, but this reference amount of change, as shown in FIG. 15, is made a constant value regardless of the estimated value of the maximum storable oxygen amount.

Further, when the estimated value of the maximum storable oxygen amount is the lower limit storage amount or more and the maximum value of the amount of change with time is larger than the reference amount of change, so long as an abnormality is not diagnosed in the diagnosis for abnormality based on the above-mentioned stoichiometric air-fuel ratio time period ratio, the upstream side exhaust purification catalyst 20 is judged to be normal (region 3 of FIG. 15). Further, at this time, the downstream side air-fuel ratio sensor 41 may also be judged to be normal.

REFERENCE SIGNS LIST 1 engine body
5 combustion chamber
7 intake port
9 exhaust port
19 exhaust manifold
20 upstream side exhaust purification catalyst
24 downstream side exhaust purification catalyst
31 ECU
40 upstream side air-fuel ratio sensor
41 downstream side air-fuel ratio sens

The invention claimed is:

1. An abnormality diagnosis system of an internal combustion engine comprising an exhaust purification catalyst which is arranged in an exhaust passage of the internal combustion engine and can store oxygen, and a downstream side air-fuel ratio sensor which is arranged at a downstream side of said exhaust purification catalyst in a direction of exhaust flow, said system comprises:
  a catalyst abnormality diagnosis system configured to use the output air-fuel ratio of said downstream side air-fuel ratio sensor when making the air-fuel ratio of the exhaust gas flowing into said exhaust purification catalyst change between a rich air-fuel ratio which is richer than the stoichiometric air-fuel ratio and a lean air-fuel ratio which is leaner than the stoichiometric air-fuel ratio as the basis to diagnose said exhaust purification catalyst for abnormality, and
  wherein said catalyst abnormality diagnosis system is configured to calculate the maximum storable oxygen amount of said exhaust purification catalyst based on at least one of the amount of oxygen which is stored in said exhaust purification catalyst in an air-fuel ratio reversal time period where the output air-fuel ratio of said downstream side air-fuel ratio sensor changes from a rich judgment air-fuel ratio which is richer than the stoichiometric air-fuel ratio or less to a lean judgment air-fuel ratio which is leaner than the stoichiometric air-fuel ratio or more and the amount of oxygen which is released from said exhaust purification catalyst in an air-fuel ratio reversal time period where the output air-fuel ratio of said downstream side air-fuel ratio sensor changes from said lean judgment air-fuel ratio or more to less than said rich judgment air-fuel ratio or less, and said catalyst abnormality diagnosis system is configured to perform first abnormality diagnosis wherein it judges that said exhaust purification catalyst has become abnormal when said calculated maximum storable oxygen amount is smaller than a lower limit storage amount, and
  wherein the system is configured to use any one of a cumulative oxygen excess/deficiency and a cumulative amount of intake air and time as a judgment parameter, and
  said catalyst abnormality diagnosis system is configured to perform second abnormality diagnosis wherein it judges that said exhaust purification catalyst has become abnormal even when said calculated maximum storable oxygen amount is a predetermined lower limit storage amount or more, if the ratio of the value of said judgment parameter in the time period where the stoichiometric air-fuel ratio judgment condition which shows that the output air-fuel ratio of said downstream side air-fuel ratio sensor is within a predetermined range near the stoichiometric air-fuel ratio compared with at least said two judgment air-fuel ratios is satisfied to the value of said judgment parameter in said air-fuel ratio reversal time period is a given reference value or less.

2. The abnormality diagnosis system of an internal combustion engine according to claim 1, wherein said catalyst abnormality diagnosis system, at the time of performing said second abnormality diagnosis, is configured to judge that said exhaust purification catalyst has become abnormal when a ratio of the value of said judgment parameter in a time period where said stoichiometric air-fuel ratio judgment condition is satisfied in a lean-rich air-fuel ratio reversal time period where the output air-fuel ratio of said downstream side air-fuel ratio sensor changes from said lean judgment air-fuel ratio or more to said rich judgment air-fuel ratio or less to the value of said judgment parameter in said lean-rich air-fuel ratio reversal time period is a given reference value or less.

3. The abnormality diagnosis system of an internal combustion engine according to claim 1, wherein said catalyst abnormality diagnosis system, at the time of performing said second abnormality diagnosis, is configured to judge that said exhaust purification catalyst has become abnormal when a ratio of the value of said judgment parameter in a time period where said stoichiometric air-fuel ratio judgment condition is satisfied in a rich-lean air-fuel ratio reversal time period where the output air-fuel ratio of said downstream side air-fuel ratio sensor changes from said rich judgment air-fuel ratio or less to said lean judgment air-fuel ratio or more to the value of said judgment parameter in said rich-lean air-fuel ratio reversal time period is a given reference value or less.

4. The abnormality diagnosis system of an internal combustion engine according to claim 1, wherein said stoichiometric air-fuel ratio judgment condition is a condition which is judged to be satisfied when the output air-fuel ratio of said downstream side air-fuel ratio sensor is between a stoichiometric judgment rich air-fuel ratio which is leaner than said rich judgment air-fuel ratio and a stoichiometric judgment lean air-fuel ratio which is richer than said lean judgment air-fuel ratio.

5. The abnormality diagnosis system of an internal combustion engine according to claim 1, wherein said stoichiometric air-fuel ratio judgment condition is a condition which is judged to be satisfied when the output air-fuel ratio of said downstream side air-fuel ratio sensor is between a stoichiometric judgment rich air-fuel ratio which is leaner than said rich judgment air-fuel ratio and a stoichiometric judgment lean air-fuel ratio which is richer than said lean judgment air-fuel ratio and the amount of change with time of the output air-fuel ratio of said downstream side air-fuel ratio sensor is a predetermined amount or less.

6. The abnormality diagnosis system of an internal combustion engine according to claim 1, wherein said catalyst abnormality diagnosis system, in said first abnormality diagnosis, is configured to calculate said maximum storable oxygen amount based only on the amount of oxygen which is released from said exhaust purification catalyst in the air-fuel ratio reversal time period in which the output air-fuel ratio of said downstream side air-fuel ratio sensor changes from the lean judgment air-fuel ratio or more to the rich judgment air-fuel ratio or less, and diagnoses said exhaust purification catalyst for abnormality based on the calculated maximum storable oxygen amount.

7. The abnormality diagnosis system of an internal combustion engine according to claim 1, wherein said catalyst abnormality diagnosis system, in said first abnormality diagnosis, is configured to calculate said maximum storable oxygen amount based only on the amount of oxygen which is stored in said exhaust purification catalyst in the air-fuel ratio reversal time period in which the output air-fuel ratio of said downstream side air-fuel ratio sensor changes from the rich judgment air-fuel ratio or more to the lean judgment air-fuel ratio or less, and diagnoses said exhaust purification catalyst for abnormality based on the calculated maximum storable oxygen amount.

8. The abnormality diagnosis system of an internal combustion engine according to claim 1, wherein said catalyst abnormality diagnosis system, in said first abnormality diagnosis, is configured to calculate said maximum storable oxygen amount based on the amount of oxygen which is stored in said exhaust purification catalyst in the air-fuel ratio reversal time period in which the output air-fuel ratio of said downstream side air-fuel ratio sensor changes from the rich judgment air-fuel ratio or more to the lean judgment air-fuel ratio or less and the amount of oxygen which is released from said exhaust purification catalyst in the air-fuel ratio reversal time period in which the output air-fuel ratio of said downstream side air-fuel ratio sensor changes from the lean judgment air-fuel ratio or more to the rich judgment air-fuel ratio or less, and diagnoses said exhaust purification catalyst for abnormality based on the calculated maximum storable oxygen amount.

9. The abnormality diagnosis system of an internal combustion engine according to claim 1, wherein said catalyst abnormality diagnosis system, in said second abnormality diagnosis, is configured to judge that the exhaust purification catalyst has become abnormal, even when said calculated maximum storable oxygen amount is greater than a predetermined lower limit oxygen amount, if the amount of change with time of the output air-fuel ratio of said downstream side air-fuel ratio sensor in said air-fuel ratio reversal time period is a reference amount of change or less.

10. The abnormality diagnosis system of an internal combustion engine according to claim 1, wherein when it is judged by said second abnormality diagnosis that said exhaust purification catalyst has become abnormal, said catalyst abnormality diagnosis system is configured to judge that said downstream side air-fuel ratio sensor has also become abnormal.

11. The abnormality diagnosis system of an internal combustion engine according to claim 1, wherein when it is judged that said exhaust purification catalyst has become abnormal, a warning light is lit.

12. The abnormality diagnosis system of an internal combustion engine according to claim 10, wherein when it is judged that said downstream side air-fuel ratio sensor has become abnormal, a warning light is lit.

* * * * *

UNITED STATES PATENT AND TRADEMARK OFFICE
CERTIFICATE OF CORRECTION

PATENT NO. : 9,732,658 B2
APPLICATION NO. : 14/496187
DATED : August 15, 2017
INVENTOR(S) : Koichi Kitaura, Hiroshi Miyamoto and Masahiro Kubo Page 1 of 1

It is certified that error appears in the above-identified patent and that said Letters Patent is hereby corrected as shown below:

In Column 8, Line 6, delete "catalyst" and insert -- catalyst 20 --, therefor.

Signed and Sealed this
Tenth Day of October, 2017

Joseph Matal
*Performing the Functions and Duties of the*
*Under Secretary of Commerce for Intellectual Property and*
*Director of the United States Patent and Trademark Office*